United States Patent
Wardetzky et al.

(10) Patent No.: US 7,764,285 B2
(45) Date of Patent: *Jul. 27, 2010

(54) COMPUTER GRAPHICS SYSTEMS AND METHODS FOR ENCODING SUBDIVISION TRIANGULAR SURFACES

(75) Inventors: Max Wardetzky, Berlin (DE); Kristjan Valur Jonsson, Hafnarf Jordur (IS)

(73) Assignee: Mental Images GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/172,371

(22) Filed: Jul. 14, 2008

(65) Prior Publication Data

US 2009/0096784 A1    Apr. 16, 2009

Related U.S. Application Data

(63) Continuation of application No. 11/562,269, filed on Nov. 21, 2006, now Pat. No. 7,400,324, which is a continuation of application No. 10/742,654, filed on Dec. 19, 2003, now Pat. No. 7,167,174.

(60) Provisional application No. 60/434,835, filed on Dec. 19, 2002.

(51) Int. Cl.
*G06T 17/00*    (2006.01)

(52) U.S. Cl. ..................... 345/420

(58) Field of Classification Search ........... None
See application file for complete search history.

(56) References Cited

U.S. PATENT DOCUMENTS 5,963,209 A * 10/1999 Hoppe ............... 345/419

| | | | | |
|---|---|---|---|---|
| 6,275,233 B1 * | 8/2001 | Gueziec | ............... | 345/419 |
| 6,356,263 B2 * | 3/2002 | Migdal et al. | ............... | 345/423 |
| 6,795,070 B1 * | 9/2004 | Laurent-Chatenet et al. | | 345/423 |
| 6,850,638 B1 * | 2/2005 | Lounsbery | ............... | 382/154 |
| 7,167,174 B2 * | 1/2007 | Wardetzky et al. | ............... | 345/420 |
| 7,400,324 B2 * | 7/2008 | Wardetzky et al. | ............... | 345/420 |
| 2004/0201584 A1 * | 10/2004 | Lee | ............... | 345/420 |

OTHER PUBLICATIONS

Michael Lee, Hanan Samet, "Navigating through Triangle Meshes Implemented as Linear Quadtrees," Apr. 2000, ACM Transactions on Graphics, vol. 19, No. 2, p. 79-121.*

* cited by examiner

*Primary Examiner*—Ulka Chauhan
*Assistant Examiner*—Jason M Repko
(74) *Attorney, Agent, or Firm*—Jacobs & Kim LLP; David Jacobs

(57) ABSTRACT

A system is described for generating a plurality of identifiers, each associated with one of a like plurality of subdivision surfaces of a surface element, and for generating, using an identifier for a subdivision surface, coordinates for the subdivision surface. Each identifier includes one or more position codes. Each position code indicates the position of a subdivision surface at a respective level relative to the next higher level, so that successive position codes in the identifier indicate the positions of subdivision surfaces through successive subdivision levels. To generate coordinates for a subdivision surface from the identifier associated with the subdivision surface, the system sequences through successive position codes in the identifier to determine locations of the subdivision surfaces through the successive levels.

13 Claims, 6 Drawing Sheets

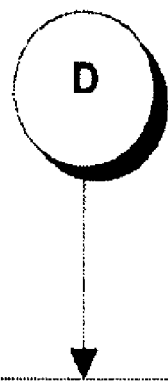

111. COMPUTER GRAPHICS SYSTEM GENERATES A TRIPLE (a,b,c;a,b,c;a,b,c) USING THE VALUES FOR "a," "b" AND "c" GENERATED IN STEPS 103 THROUGH 109

112. COMPUTER GRAPHICS SYSTEM ADDS THE VALUE "sign/size" TO "a" IN THE FIRST TRIPLE, "b" IN THE SECOND TRIPLE, AND "c" IN THE THIRD TRIPLE, THEREBY TO GENERATE THE BARYCENTRIC COORDINATES, RELATIVE TO THE UPPER LEVEL TRIANGLE, OF THE SUBDIVISION TRIANGLE ASSOCIATED WITH THE IDENTIFIER

*FIG. 3B*

COMPUTER GRAPHICS SYSTEMS AND METHODS FOR ENCODING SUBDIVISION TRIANGULAR SURFACES

CROSS-REFERENCE AND CLAIM OF PRIORITY

This application is a continuation of U.S. patent application Ser. No. 11/562,269 filed Nov. 21, 2006 (pending), which is a continuation of U.S. patent application Ser. No. 10/742,654 filed Dec. 19, 2003 (now U.S. Pat. No. 7,167,174), which claims priority, benefit from Provisional Application 60/434,835 filed Dec. 19, 2002 (expired), each of which is incorporated herein as if set forth herein in its entirety.

FIELD OF THE INVENTION

The invention relates generally to the field of computer graphics, computer-aided geometric design and the like, and more particularly to systems for, and methods, of efficiently encoding subdivision surfaces of an upper level surface element and recovering their coordinates.

BACKGROUND OF THE INVENTION

Generally, in computer graphics, objects are represented as surfaces, with the surfaces being represented by meshes. A mesh consists of a set of vertices, or points, in multi-dimensional space, which are interconnected by edges. The edges define polygonal faces, which may be in the form of triangles, quadrilaterals, and so forth. In some computer graphic operations it is desirable to generate a representation of a surface at a finer resolution than a current representation. For a surface that is represented by one or more triangles, a subdivision surface is typically formed by dividing the upper level triangle into four smaller triangles in a regular manner, thereby to form a set of first level subdivision triangles. One or more of the first-level subdivision triangles may be further subdivided, through any of a number of subdivision levels. The subdivision surfaces defined by the subdivision triangles may be used to provide, for example complex contours for the surfaces of objects in a scene, which can allow for realistic renderings of images of the objects.

A problem arises in that, since a triangle is defined by three points in space typically, 3n coordinates are required to define the triangle, "n" coordinates for each of the three points that define the triangle in n-dimensional space. Each of the coordinates will need to be expressed as floating point numbers. Accordingly, it will be appreciated that for any scene that includes objects whose surfaces have any significant degree of complexity, the storage requirements for the database that defines the objects in the scene can be enormous.

SUMMARY OF THE INVENTION

The invention provides a new and improved computer graphics system for, and method of, efficiently encoding subdivision surfaces of a triangular surface element and recovering their barycentric coordinates relative to the upper level triangular surface element. The efficient encoding allows for a reduction in the amount of storage that is necessary for the database that defines the objects in a scene in a computer graphics system.

In brief summary, in one aspect the invention provides a system for generating a plurality of identifiers, each associated with one of a like plurality of subdivision surfaces of a surface element. Each subdivision surface has a predetermined position relative to the surface element. The surface element is associated with a higher-level identifier, with the higher level identifier comprising at least one bit, with the higher level identifier being stored in respective bit positions of a word. The system comprises a shifter module, a replication module and a position code insertion module. The shifter module is configured to shift the higher level identifier by a selected number of bit positions thereby to generate a shifted higher level identifier in the word, the number of bit positions being associated with a number corresponding to the number of subdivision surfaces to be associated with the surface element. The replication module is configured to replicate the shifted higher level identifier to generate a plurality of replicated shifted higher level identifiers, each replicated shifted higher level identifier being associated with one of the subdivision triangular surfaces. The position code insertion module is configured to insert, in the vacated portion of each of the shifted replicated higher level identifiers, a position code identifying the position, relative to the surface element, of the subdivision surface that is associated with the respective replicated shifted higher level identifier.

In another aspect, the invention provides a system for generating coordinates for a subdivision surface of an upper level surface element at a predetermined subdivision level from an identifier associated with the subdivision surface. The identifier includes a plurality of position codes each identifying a position relative to a higher level. The system comprises a position code selection module, a relative position determination module and an iteration control. The position code selection module is configured to select from the identifier one of the position codes. The relative position determination module is configured to determine the position of a subdivision surface associated with the position code relative to a higher level subdivision surface. The iteration control is configured to control the position code selection module and the relative position determination module through a plurality of iterations, to enable the position code selection module to iteratively select identifiers associated with successive levels thereby to enable the relative position determination module to determine positions of subdivision surfaces at successive levels, to the predetermined subdivision level.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
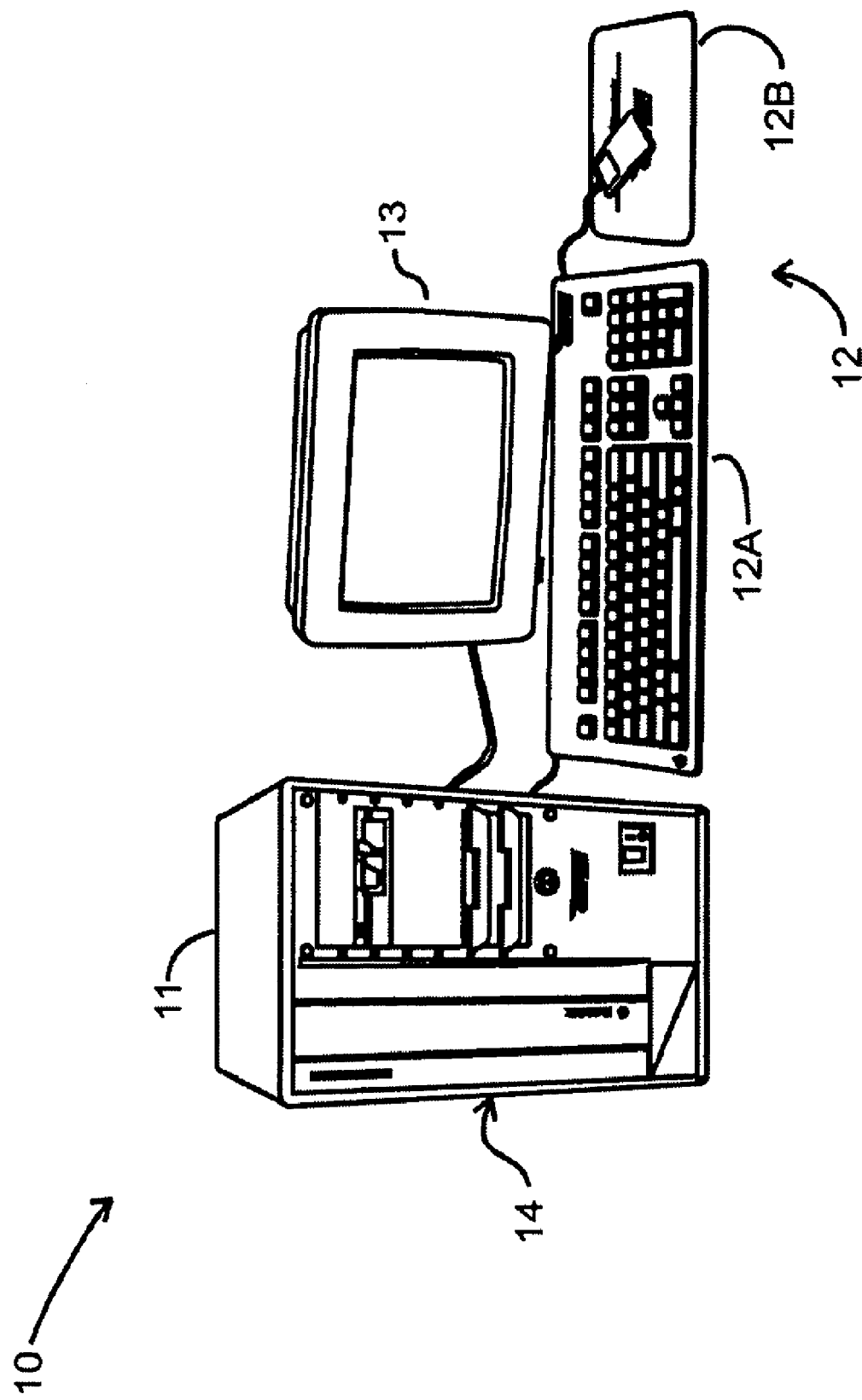
FIG. 1 depicts a computer graphics system for efficiently encoding subdivision surfaces of a triangular surface element and recovering their barycentric coordinates.

FIG. 1 depicts a computer graphics system 10 for efficiently encoding subdivision surfaces of a triangular surface element in respective identifiers, each associated with a respective subdivision surface, and for using the identifier associated with a respective subdivision surface to recover the location information for the respective subdivision surface. In the embodiment described herein, the location information is in the form of barycentric coordinates for the subdivision surface relative to an upper level surface element.

With reference to FIG. 1, the computer graphics system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer graphics system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

The processor module 11 generally includes a processor, which may be in the form of one or more microprocessors, a main memory, and will generally include one a mass storage subsystem including one or more disk storage devices. The memory and disk storage devices will generally store data and programs (collectively, "information") to be processed by the processor, and will store processed data which has been generated by the processor. The processor module includes connections to the operator input device(s) 12 and the display device(s) 13, and will receive information input by the operator through the operator input device(s) 12, process the input information, and store the processed information in the memory and/or mass storage subsystem. In addition, the processor module can generate video display information, which can form part of the information obtained from the memory and disk storage device as well as processed data generated by the processor module itself, and provide the video display information to the display device(s) for display to the operator. The processor module 11 may also include connections (not shown) to hardcopy output devices such as printers for facilitating the generation of hardcopy output, as well as connections to modems and/or network interfaces (also not shown) for connecting the system 10 to the public telephony system and/or in a computer network for facilitating the transfer of information, and the like.

The computer graphics system 10 generates, from input provided by the operator, information defining the initial and subsequent shapes, surface characteristics and other information regarding multi-dimensional objects in a scene, which information may, for example, be used to generate a two-dimensional image of the scene. The image that may be generated represents the image of the object(s) in the scene as illuminated by one or more light sources, and as projected onto an image plane of a camera, with the object having a spatial position and rotational orientation relative to the illumination direction and the image plane and a scaling and/or zoom setting as selected by the operator. The surfaces of the objects are typically defined by a lattice of polygons, such as triangles or quadrilaterals, with each polygon being defined by three (in the case of triangles) or four (in the case of quadrilaterals) points in space. In the following, it will be assumed that the surface of the object is defined by a lattice that includes at least one triangle. The triangle may, in response to input from an operator, be subdivided into a plurality of other triangles, which will be referred to as subdivision triangles, as will be described below in connection with FIG. 2. One or more of the first-level subdivision triangles may be further subdivided, and so on through a number of subdivision levels. The invention provides an arrangement for efficiently encoding the subdivision triangles through the respective subdivision levels in respective identifiers. As will be clear from the following, the encoding of each identifier will indicate both the subdivision level of the subdivision triangle associated with the identifier, and the position of the subdivision triangle in relation to higher level triangles, in particular, the upper level triangle.

In addition, the invention provides an arrangement for using the identifier associated with a respective subdivision triangle to recover the barycentric coordinates of the points that define the respective subdivision triangle, relative to a higher-level surface element. In the embodiment described herein, the invention provides an arrangement for recovering the barycentric coordinates of the three points that define the respective subdivision level.

The invention allows for the compact storage of information relating to the subdivision triangles at the various subdivision levels, since, as will be apparent from the following, a single storage location in the computer graphics system can be used to store sufficient information relating to a subdivision triangle to enable the coordinates of the points defining the subdivision triangle to be determined, instead of the at least three storage locations that would be required to explicitly store the respective coordinates of each of the three points that define the subdivision triangle. Accordingly, the invention allows the amount of computer data storage that would be required to store information relating to subdivision triangles in a simulated scene in the computer graphics system 10 to be considerably reduced.

Moreover, the invention reduces the amount of time that is required to generate subdivision triangles associated with a higher-level triangle. To generate the subdivision triangles, computer graphics system 10 needs only to generate the respective identifiers for the respective subdivision triangles, instead of the explicit multi-dimensional coordinates for the points that are necessary to define the subdivision triangles. Generally, the identifiers can be generated using integer arithmetic, whereas generating the explicit coordinates typically requires floating point arithmetic. The computer graphics system 10 can, using a methodology described below, generate the explicit coordinates of the points defining a subdivision triangle only when it needs to make use of the explicit coordinates. As will be further described below, the computer graphics system 10 can make extensive use of integer arithmetic when generating the coordinates of the points defining a subdivision triangle when it needs to generate them.

Figure 2:
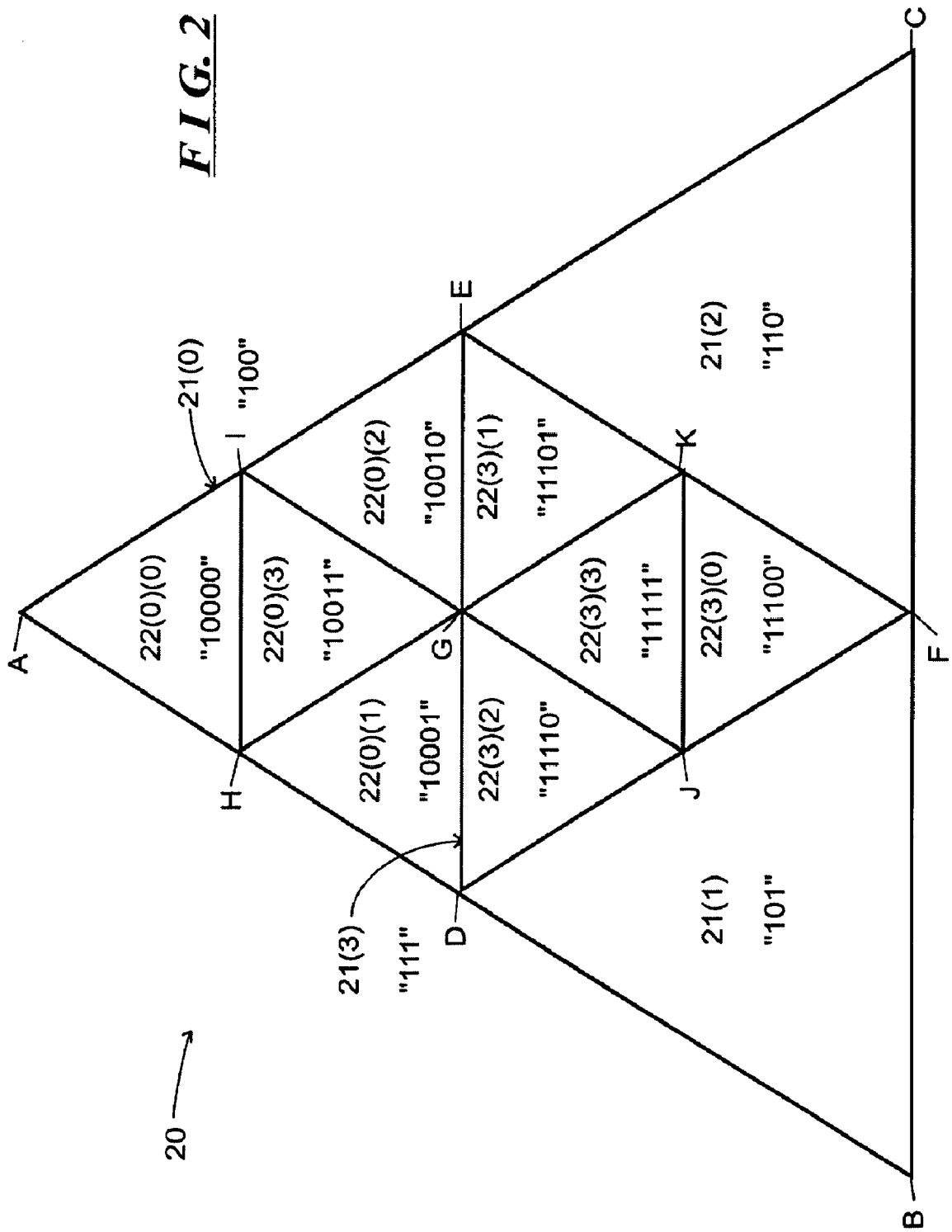
FIG. 2 is a diagram depicting a triangular surface element and subdivision surfaces thereof, useful in understanding the operation of the computer graphics system depicted in FIG. 1.

The arrangement for efficiently encoding subdivision triangles will be described in connection with FIG. 2. With reference to FIG. 2, that FIG. depicts an upper-level triangle 20, defined by points ABC, that has been subdivided into four subdivision triangles 21(0), 21(1), 21(2) and 21(3) (generally identified by reference numeral 21 ($t_1$) ($t_1$=0, 1, 2, or 3), with the subscript to the index "t" indicating the subdivision level). Subdivision triangle 21(0) is defined by points ADE, subdivision triangle 21(1) is defined by points DBF, subdivision triangle 21(2) is defined by points EFC, and subdivision triangle 21(3) is defined by points DEF. The subdivision triangles 21($t_1$) are formed such that point D is at the midpoint of line segment AB, point E is at the midpoint of line segment AC, and point F is at the midpoint of line segment BC. The illustrative upper-level triangle 20 depicted in FIG. 2 is an equilateral triangle, but it will be appreciated that the upper level triangle may have any triangular shape.

Each of the subdivision triangles 21($t_1$) is identified by an identifier that comprises three binary digits, or "bits," "$b_2b_1b_0$." The high order bit $b_2$ of the identifier is set to "one," and the binary-encoded value of the two low-order bits $b_1b_0$ correspond to the value of the index "$t_1$". Thus, subdivision triangle 21(0) is identified by the bit pattern 100, subdivision triangle 21(1) is identified by the bit pattern 101, subdivision triangle 21(2) is identified by bit pattern 110 and subdivision triangle 21(3) is identified by bit pattern 111, all of which are shown in FIG. 2. As is well known, typically, computer systems store information in the form of words comprising a predetermined number of bits, and the computer graphics system 10 can store each identifier in a word.

One or more of the subdivision triangles 21($t_1$) can be further subdivided in a similar manner, to form second level subdivision triangles. As shown in FIG. 2, each of subdivision triangles 21(0) and 21(3) is further subdivided into four subdivision triangles. One or more of subdivision triangles 21(1) and 21(2) may also be subdivided into respective sets of subdivision triangles, but, as will be appreciated by those skilled in the art, if a subdivision triangle at a particular subdivision level is further subdivided, it is not required that the other subdivision triangles at that same level be subdivided. In the illustration depicted in FIG. 2, subdivision triangle 21(0) is divided into subdivision triangles 22(0)(0) through 22(0)(3), and subdivision triangle 21(3) is divided into subdivision triangles 22(3)(0) through 22(3)(3). The second level subdivision triangles will generally be identified by reference numeral 22($t_1$)($t_2$), where index "$t_1$" identifies the first-level subdivision triangle in which the second-level subdivision triangle was formed, and index "$t_2$" ($t_2$=0, 1, 2 or 3) refers to the particular second-level subdivision triangle. Subdivision triangle 22(0)(0) is defined by points AHI, subdivision triangle 22(0)(1) is defined by points HDG, subdivision triangle 22(0)(2) is defined by points IGE and subdivision triangle 22(0)(3) is defined by points HIG. Subdivision triangle 22(3)(0) is defined by points FJK, subdivision triangle 22(3)(1) is defined by points GEK, subdivision triangle 22(3)(2) is defined by points DGJ and subdivision triangle 22(3)(3) is defined by points GJK. Similar to the positioning of the points D, E and F that serve to define, along with points A, B and C, the first level subdivision triangles 21($t_1$), points H, I and G, that, along with points A, D and E serve to define the second level subdivision triangles 22(0)($t_2$), are at the midpoints of line segments AD, AE and DE, respectively. Similarly, the points J and K, which, along with points D, E, F, and G, serve to define the second level subdivision triangles 22(3) ($t_2$), are at the midpoints of line segments DF and EF, respectively.

Similarly to the first-level subdivision triangles 21($t_1$), each of the second-level subdivision triangles 22($t_1$)($t_2$) is associated with an identifier. In each case, the identifier comprises five bits $b_4b_3b_2b_1b_0$, where bits in bit positions $b_4b_3b_2$ of the identifier for the second-level subdivision triangle 22($t_1$)($t_2$) correspond to the bits in bit positions $b_2b_1b_0$ comprising the identifier associated with the first-level subdivision triangle 21($t_1$) in which the second level subdivision triangles were formed, and the binary-encoded value of the bits in bit positions $b_1b_0$ of the identifier for the second-level subdivision triangle 22($t_1$)($t_2$) correspond to the value of the index "$t_2$" of the particular second-level subdivision triangle 22($t_1$)($t_2$) associated with the identifier. Accordingly, the second-level subdivision triangle 22(0)(0) is identified by the bit pattern 10000, subdivision triangle 22(0)(1) is identified by the bit pattern 10001, subdivision triangle 22(0)(2) is identified by bit pattern 10010 and subdivision triangle 22(0)(3) is identified by bit pattern 10011, are as shown in FIG. 2. Similarly, subdivision triangle 22(3)(0) is identified by the bit pattern 11100, subdivision triangle 22(3)(1) is identified by the bit pattern 11101, subdivision triangle 22(3)(2) is identified by bit pattern 11110 and subdivision triangle 22(3)(3) is identified by bit pattern 11111, as shown in FIG. 2. As with the identifiers for the first-level subdivision triangles 21 ($t_1$), each identifier for a second-level subdivision triangle 22($t_1$) ($t_2$) can be stored as a word by the computer graphics system 10.

It will be apparent from examining FIG. 2 that the first level subdivision triangles 21(0) through 21(2) all have the same alignment as the upper level triangle 20. On the other hand, the first level subdivision triangle 21(3) is rotated 180 degrees relative to the upper level triangle 20. Similarly, it will be apparent from examining FIG. 2 that, for the second level subdivision triangles 22(0)($t_2$), the indices $t_2$ that are used to identify the second level subdivision triangles 22(0)($t_2$) in the first-level subdivision triangle 21(0), are in the same relative positions within the triangle 21(0) as the indices $t_1$ for the first-level subdivision triangles 21($t_1$) in the upper level triangle 20. That is, (i) the second-level subdivision triangle 22(0)(0) is at the top (as shown in FIG. 2) in first-level subdivision triangle 21(0) and is in the same alignment as subdivision triangle 21(0), which is similar to the positioning and alignment of the first-level subdivision triangle 21(0) relative to the upper-level triangle 20;

(ii) the second-level subdivision triangle 22(0)(1) is at the lower left in the first-level subdivision triangle 21(0) and is in the same alignment as subdivision triangle 21(0), which is similar to the positioning and alignment of the first level subdivision triangle 21(1) relative to the upper-level triangle 20;

(iii) the second-level subdivision triangle 21(0)(2) is at the lower right in the first-level subdivision triangle 21(0) and is in the same alignment as subdivision triangle 21(0), which is similar to the positioning and alignment of the first level subdivision triangle 21(2) relative to the upper-level triangle 20; and (iv) the second-level subdivision triangle 21(0)(3) is in the middle of the lower half in the first level subdivision triangle 21(0), and has an alignment rotated by 180 degrees relative to the first-level subdivision triangle 21(0), similar to the positioning and alignment of the first level subdivision triangle 21(3) relative to the upper-level triangle 20.

If either or both of the first-level subdivision triangles 21(1) or 21(2) are also subdivided, their second-level subdivision triangles will be associated with indices, and associated identifiers, in similar locations and alignments relative to the first-level subdivision triangle 21(0). That is, if any of those first-level subdivision triangles has been subdivided, its second-level subdivision triangles will be labeled in a similar manner as the second-level subdivision triangles 22(0)(0) through 22(0)(3). Accordingly if one or both of the first-level subdivision triangles 21(1) or 21(2) is further subdivided, (v) the second-level subdivision triangle at the top (respecting the alignment depicted in FIG. 2) of the first-level subdivision triangle 21(1) or 21(2) will be associated with the same index $t_2$=(0), and the same two low order bits $b_1b_0$=00, as second-level subdivision triangle 22(0)(0) (reference item (i) above), while keeping the index $t_1$=(1) or (2) of the respective first-level subdivision triangle 21(1) or 21(2);

(vi) the second-level subdivision triangle at the lower left will be associated with the same index $t_2$=(1), and the same two low-order bits $b_1b_0$=01, as second-level subdivision triangle 22(0)(1) (reference item (ii) above), while keeping the index $t_1$=(1) or (2) of the respective first-level subdivision triangle 21(1) or 21(2);

(vii) the second-level subdivision triangle at the lower right will be associated with the same index $t_2$=(2), and the same two low order bits $b_1b_0$=10, as the second-level subdivision triangle 22(0)(2) (reference item (iii) above), while keeping the index $t_1$=(1) or (2) of the respective first-level subdivision triangle 21(1) or 21(2); and (viii) the second-level subdivision triangle at the middle of the lower half of the respective first level subdivision triangle 21(1), 21(2), will be associated with the same index $t_2$=(3), and the same two low-order bits $b_1b_0$=11, as second level subdivision triangle 22(0)(3) (reference item (iv) above), while keeping the index $t_1$=(1) or (2) of the respective first-level subdivision triangle 21(1) or 21(2).

The relative locations of the indices $t_2$ and the low-order bits $b_1b_0$ of the associated identifiers, of the second-level subdivision triangles 22(3)($t_2$) formed in first-level subdivision triangle 21(3) differ from those formed in triangles 21(0) through 21(2). First-level subdivision triangle 21(3) is rotated by 180 degrees relative to upper-level triangle 20, and the indices $t_2$ and bit patterns $b_1b_0$ of the second level subdivision triangle 22(3)($t$) are also. That is, for the second-level subdivision triangles 22(3)($t$), (ix) the second-level subdivision triangle 22(3)(0) is at the bottom (as shown in FIG. 2) of the first-level subdivision triangle 21(3), in contrast to the positioning of second-level subdivision triangle 22(0)(0) at the top in the first-level subdivision triangle 21(0) (reference item (i) above);

(x) the second-level subdivision triangle 22(3)(1) is at the upper right of the first-level subdivision triangle 21(3), in contrast to the positioning of the second-level subdivision triangle 22(0)(1) at the lower left in the first-level subdivision triangle 21(0) (reference item (ii) above);

(xi) the second-level subdivision triangle 22(3)(2) is at the upper left of the first-level subdivision triangle 21(3), in contrast to the positioning of the second-level subdivision triangle 22(0)(2) at the lower right in the first-level subdivision triangle 21(0) (reference item (iii) above); and (xii) the second-level subdivision triangle 22(3)(3) is at the middle of the upper half of the first-level subdivision triangle 21(3), in contrast to the positioning of the second-level subdivision triangle 22(0)(3) at the middle of the lower half in the first-level subdivision triangle 21(0) (reference item (iv) above).

It will be appreciated that one or more of the second-level subdivision triangles 22($t_1$)($t_2$) may also be subdivided into respective third-level subdivision triangles (not shown). Each third-level subdivision triangle will be associated with a set of indices ($t_1$)($t_2$)($t_3$) ($t_3$=0, 1, 2 or 3), with the portion of the sequence ($t_1$)($t_2$) corresponding to the indices ($t_1$)($t_2$) that are associated with the second-level subdivision triangle 22($t_1$)($t_2$) from which the respective third level subdivision triangle was formed, and the index ($t_3$) uniquely identifying the respective third-level subdivision triangle within the second-level subdivision triangle 22($t_1$)($t_2$). The locations of the third-level subdivision triangles associated with indices ($t_1$)($t_2$)(0), ($t_1$)($t_2$)(1), ($t_1$)($t_2$)(2) and ($t_1$)($t_2$)(3), relative to the respective second-level subdivision triangle in which they were formed, will depend on the alignment of the particular second-level subdivision triangle in which third-level subdivision triangles have been formed. For example, if the second-level subdivision triangle that has be subdivided is second-level subdivision triangle 22(0)(0), 22(0)(1), 22(0)(2) or 22(3)(3), all of which have alignments similar to upper level triangle 20, or first-level subdivision triangles 21(0), 21(1) or 21(2), the relative locations of the indices will be similar to that described above in connection with items (v) through (viii) above. On the other hand, if the second-level subdivision triangle that is to be subdivided is second level subdivision triangle 22(0)(3), 22(3)(0), 22(3)(1) or 22(3)(2), whose alignments are rotated one hundred and eighty degrees relative to the upper-level triangle 20, the relative locations of the indices will be similar to that described above in connection with items (ix) through (xii) above. Each of the third-level subdivision triangles will also be associated with an identifier having a bit pattern $b_7 \ldots b_0$ whose upper five bits $b_7 \ldots b_3$ correspond to the bit pattern of bits $b_5 \ldots b_0$ of the identifier of the second level subdivision triangle 22($t_1$)($t_2$) in which the respective third-level subdivision triangle was formed, with the binary-encoded value of the two low order bits $b_1b_0$ corresponding to the value of the index $t_3$ of the respective third-level subdivision triangle.

Subdivision triangles at subsequent levels may also be formed in a similar manner. A subdivision triangle at the "n-th" subdivision level will be associated with an index ($t_1$)...($t_n$), similar to those indicated in the various reference numerals depicted in FIG. 2. In addition, the subdivision triangle at the "n-th" subdivision level will be associated with an identifier $b_{2n}b_{2n-1} \ldots b_0$, in which bit $b_{2n}$ has the value "one," and each pair of bits $b_{x+1}b_x$ (index x=2n−2, 2n−4, ..., 0) that is associated with a level 1, ..., n will correspond to the binary-encoded value of the particular portion of the index ($t_1$) for the respective level $$l = n - \frac{x}{2}.$$

As with the identifiers for the first-and second-level subdivision triangles 21($t_1$), 22($t_1$)($t_2$), each identifier for an n-th level subdivision triangle 22($t_1$)...($t_n$) can be stored in a word by the computer graphics system 10. It will be appreciated that, since two bits $b_{x+1}b_x$ are required for each subdivision level, and one bit is utilized for the high order $b_{2n}$ of the identifier, a thirty-two bit word will accommodate identifiers for up to fifteen subdivision levels. In that case, the bit or bits in bit positions $b_{31} \ldots b_{2n+1}$ will all have the value "zero," so that bit $b_{2n}$ will be the most significant bit in the word having the value "one," thereby indicating the beginning of the identifier in bit positions $b_{2n} \ldots b_0$.

As noted above, the invention also provides an arrangement that, given an identifier $b_{2n} \ldots b_0$ for a subdivision triangle, generates coordinates of the points defining the subdivision triangle. In the embodiment described herein, the arrangement generates the barycentric coordinates, relative to the upper-level triangle, of the points defining the respective subdivision triangle. As is well-known, if the barycentric coordinates of a point P (not shown) in a plane containing the triangle defined by the three points A,B,C are given by $(\alpha_A, \beta_A, \chi_A)$, $(\alpha_B, \beta_B, \chi_B)$ and $(\alpha_C, \beta_C, \chi_C)$, each of the "$\alpha$," "$\beta$" and "$\chi$" will correspond to the weighs that correspond to the relative distances from points A, B and C, to the point P, respectively. Thus, for example, the barycentric coordinates of points A, B and C are (1,0,0), (0,1,0) and (0,0,1) respectively. Similarly, the barycentric coordinates of points D, E and F, which, together with points A, B, and C, define the first-level subdivision triangles $$21(t_1), \text{ are } (\alpha_D, \beta_D, \chi_D) = \left(\frac{1}{2}, \frac{1}{2}, 0\right),$$

$$(\alpha_E, \beta_E, \chi_E) = \left(\frac{1}{2}, 0, \frac{1}{2}\right) \text{ and } (\alpha_F, \beta_F, \chi_F) = \left(0, \frac{1}{2}, \frac{1}{2}\right),$$

respectively. Similarly, the barycentric coordinates of points G, H, I, J and K, which, together with other points, define the second-level subdivision triangles $22(t_1)(t_2)$, are $$(\alpha_G, \beta_G, \chi_G) = \left(\frac{1}{2}, \frac{1}{4}, \frac{1}{4}\right),$$

$$(\alpha_H, \beta_H, \chi_H) = \left(\frac{3}{4}, \frac{1}{4}, 0\right), (\alpha_I, \beta_I, \chi_I) = \left(\frac{3}{4}, 0, \frac{1}{4}\right),$$

$$(\alpha_J, \beta_J, \chi_J) = \left(\frac{1}{4}, \frac{1}{2}, \frac{1}{4}\right) \text{ and } (\alpha_K, \beta_K, \chi_K) = \left(\frac{1}{4}, \frac{1}{4}, \frac{1}{2}\right),$$

respectively. It will be appreciated that the barycentric coordinates of point A contains a "one" for the "$\alpha_A$" component of the coordinates and "zero" for the "$\beta_A$" and "$\chi_A$" components and similarly for the barycentric coordinates of points B and C. On the other hand, the barycentric coordinates of a point, such as point F, on line segment BC, contains a "zero" for the "$\alpha_F$" component and values for the "$\beta_F$" and "$\chi_F$" coordinates that indicate the relative distance of the point from points B and C, respectively, and similarly for the barycentric coordinates of points, such as points E and D, on line segments AC and AB, respectively. Since the barycentric coordinates are weights, barycentric coordinates $(x\alpha, x\beta, x\chi)$ for any constant value "x" identify the same point as barycentric coordinates $(\alpha, \beta, \chi)$.

As noted above, the barycentric coordinates of points A, B and C, respectively, which defining the top-level triangle in FIG. 2, are (1,0,0), (0,1,0) and (0,0,1), respectively. These three coordinates can be combined into a single three-element triple, with each element of the triple representing the barycentric coordinates of one of the three points A, B and C defining upper level triangle 20 as follows:

$$(1a+0b+0c, 0a+1b+0c, 0a+0b+1c) \tag{1},$$

where the coefficients "1," "0," "0" of the first element "1a+0b+0c" of the triple in (1) correspond to the barycentric coordinates (1,0,0) of point A, the coefficients "0," "1," "0" of the second element "0a+1b+0c" correspond to the barycentric coordinates (0,1,0) of point B, and the coefficients "0," "1" of the third element correspond to the barycentric coordinates (0,0,1) of point C.

The foregoing can be extended to the first-level subdivision triangles $21(t_1)$. As noted above, the barycentric coordinates of points D, E and F, which, together with points A, B, and C define the first-level subdivision triangles $21(t_1)$, are $$\left(\frac{1}{2}, \frac{1}{2}, 0\right), \left(\frac{1}{2}, 0, \frac{1}{2}\right) \text{ and } \left(0, \frac{1}{2}, \frac{1}{2}\right)$$

respectively.

In that case, the triple, analogous to (1) above, that defines the first-level subdivision triangle $21(0)$, can be established as follows:

$$\left(1a+0b+0c, \frac{1}{2}a+\frac{1}{2}b+0c, \frac{1}{2}a+0b+\frac{1}{2}c\right), \tag{2}$$

where the coefficients "1," "0," "0" of the first element "1a+0b+0c" of the triple in (2) correspond to the barycentric coordinates (1,0,0) of point A, the coefficients "½," "½," "0" of the second element $$\text{"}\frac{1}{2}a+\frac{1}{2}b+0c\text{"}$$

correspond to the barycentric coordinates $$\left(\frac{1}{2}, \frac{1}{2}, 0\right)$$

of point D, and the coefficients "½", "0," "½" of the third element $$\text{"}\frac{1}{2}a+0b+\frac{1}{2}c\text{"}$$

correspond to the barycentric coordinates $$\left(\frac{1}{2}, 0, \frac{1}{2}\right)$$

of point E.

The triple, analogous to (1) above, that defines the first-level subdivision triangle $21(1)$, can be established as follows:

$$\left(\frac{1}{2}a+\frac{1}{2}b+0c, 0a+1b+0c, 0a+\frac{1}{2}b+\frac{1}{2}c\right), \tag{3}$$

where the coefficients "½," "½," "0" of the first element $$"\frac{1}{2}a + \frac{1}{2}b + 0c"$$

of the triple in (3) correspond to the barycentric coordinates $$\left(\frac{1}{2}, \frac{1}{2}, 0\right)$$

of point D, the coefficients "0," "1," "0" of the second element "0a+1b+0c" correspond to the barycentric coordinates (0,1,0) of point B, and the coefficients "0," "½", "½" of the third element $$"0a + \frac{1}{2}b + \frac{1}{2}c"$$

correspond to the barycentric coordinates $$\left(0, \frac{1}{2}, \frac{1}{2}\right)$$

of point F.

The triple, analogous to (1) above, that defines the first-level subdivision triangle 21(2), can be established as follows:

$$\left(\frac{1}{2}a + 0b + \frac{1}{2}c, 0a + \frac{1}{2}b + \frac{1}{2}c, 0a + 0b + 1c\right), \quad (4)$$

where the coefficients "½," "0," "½," of the first element $$"\frac{1}{2}a + 0b + \frac{1}{2}c"$$

of the triple in (4) correspond to the barycentric coordinates $$\left(\frac{1}{2}, 0, \frac{1}{2}\right)$$

of point E, the coefficients "0," "½", "½" of the second element $$"0a + \frac{1}{2}b + \frac{1}{2}c"$$

correspond to the barycentric coordinates $$\left(0, \frac{1}{2}, \frac{1}{2}\right)$$

of point F, and the coefficients "0," "0," "1" of the third element "0a+0b+1c" correspond to the barycentric coordinates (0,0,1) of point C.

Finally, the triple, analogous to (1) above, that defines the first-level subdivision triangle 21(3), can be established as follows:

$$\left(0a + \frac{1}{2}b + \frac{1}{2}c, \frac{1}{2}a + 0b + \frac{1}{2}c, \frac{1}{2}a + 0b + \frac{1}{2}c\right), \quad (5)$$

where the coefficients "0," "½," "½," of the first element $$"0a + \frac{1}{2}b + \frac{1}{2}c"$$

of the triple in (5) correspond to the barycentric coordinates $$\left(0, \frac{1}{2}, \frac{1}{2}\right)$$

of point F, the coefficients "½", "0," "½" of the second element $$"\frac{1}{2}a + 0b + \frac{1}{2}c"$$

correspond to the barycentric coordinates $$\left(\frac{1}{2}, 0, \frac{1}{2}\right)$$

of point E, and the coefficients "½", "0," "½" of the third element "0a+0b+1c" correspond to the barycentric coordinates (0,0,1) of point C.

It will be appreciated that, in each of (1) through (5), and in the following, the terms with coefficients of "0" need not be depicted, although it will be appreciated that the particular variable "a," "b" or "c" whose coefficient is "0" will represent a "0" in the barycentric coordinates of the point associated with the respective triple. Similarly, a coefficient whose value of "1" need not be depicted. That is, (1) can be depicted as "(a,b,c)," (2) can be depicted as $$"\left(a, \frac{1}{2}a + \frac{1}{2}b, \frac{1}{2}a + \frac{1}{2}c\right),"$$

and so forth

Using the notation as described above, the operation of generating first-level subdivision triangles $21(t_1)$ can be considered an "action" on upper-level triangle 20, with the actions "M" being given as .

$$(a, b, c) \xrightarrow{M} \begin{cases} \left(a, \frac{1}{2}a + \frac{1}{2}b, \frac{1}{2}a + \frac{1}{2}c\right) = \frac{a}{2}(1, 1, 1) + \frac{1}{2}(a, b, c): & M = 0 \\ \left(\frac{1}{2}a + \frac{1}{2}b, b, \frac{1}{2}b + \frac{1}{2}c\right) = \frac{b}{2}(1, 1, 1) + \frac{1}{2}(a, b, c): & M = 1 \\ \left(\frac{1}{2}a + \frac{1}{2}c, \frac{1}{2}b + \frac{1}{2}c, c\right) = \frac{c}{2}(1, 1, 1) + \frac{1}{2}(a, b, c): & M = 2 \\ \left(\frac{1}{2}b + \frac{1}{2}c, \frac{1}{2}a + \frac{1}{2}c, \frac{1}{2}a + \frac{1}{2}b\right) = \frac{a+b+c}{2}(1, 1, 1) + \frac{-1}{2}(a, b, c): & M = 3, \end{cases} \quad (6)$$

Examining equations (6), and with reference to the discussion above in connection with (1) through (5), it will be apparent that, in the first line, the triple $$\left(a, \frac{1}{2}a + \frac{1}{2}b, \frac{1}{2}a + \frac{1}{2}c\right)$$

represents the barycentric coordinates $$(1, 0, 0), \left(\frac{1}{2}, \frac{1}{2}, 0\right), \text{ and } \left(\frac{1}{2}, 0, \frac{1}{2}\right)$$

of points A, D and E, respectively, that define first-level subdivision triangle 21(0). Similarly, in the second line, the triple $$\left(\frac{1}{2}a + \frac{1}{2}b, b, \frac{1}{2}b + \frac{1}{2}c\right)$$

represents the barycentric coordinates $$\left(\frac{1}{2}, \frac{1}{2}, 0\right), (0, 1, 0)$$

and $$\left(0, \frac{1}{2}, \frac{1}{2}\right)$$

of points D, B, and F, respectively, that define the first-level subdivision triangle 21(1). In the third line, the triple $$\left(\frac{1}{2}a + \frac{1}{2}c, \frac{1}{2}b + \frac{1}{2}c, c\right)$$

represents the barycentric coordinates $$\left(\frac{1}{2}, 0, \frac{1}{2}\right), \left(0, \frac{1}{2}, \frac{1}{2}\right)$$

and (0,0,1) of points E, F, and C, respectively, that define the first-level subdivision triangle 21(2). Finally, in the fourth line, the triple $$\left(\frac{1}{2}b + \frac{1}{2}c, \frac{1}{2}a + \frac{1}{2}c, \frac{1}{2}a + \frac{1}{2}b\right)$$

represents the barycentric coordinates $$\left(0, \frac{1}{2}, \frac{1}{2}\right), \left(\frac{1}{2}, 0, \frac{1}{2}\right) \text{ and } \left(\frac{1}{2}, \frac{1}{2}, 0\right)$$

of the points F, E, and D, respectively, that define the first-level subdivision triangle 21(3). It will be appreciated that, for first-level subdivision triangles 21(0), 21(1) and 21(2), which have a similar alignment as the upper-level triangle 20, the triples that represent the barycentric coordinates of the points defining the first level subdivision triangles are such that the first element of each triple represents the barycentric coordinates of the point A, D and E at the top (as shown in FIG. 2) of the respective subdivision triangle, the second element represents the barycentric coordinates of the point D, B and F at the lower left, and the third element represents the barycentric coordinates of the point E, F and C at the lower right. On the other hand, for first level subdivision triangle 21(3), the first element of the triple represents the barycentric coordinates of the point F at the bottom, the second element represents the barycentric coordinates of the point E at the upper right, and the third element represents the barycentric coordinates of the point D at the upper left, since the first-level subdivision triangle 21(3) is rotated by 180 degrees relative to the upper-level triangle 20.

With continued reference to equations (6), for respective actions M=0, 1, 2 and 3, the following two-by-two matrices are defined:

$$M = 0: M_0 = \begin{pmatrix} 1 & 0 \\ \frac{a}{2} & \frac{1}{2} \end{pmatrix} \quad (7)$$

$$M = 1: M_1 = \begin{pmatrix} 1 & 0 \\ \frac{b}{2} & \frac{1}{2} \end{pmatrix}$$

$$M = 2: M_2 = \begin{pmatrix} 1 & 0 \\ \frac{c}{2} & \frac{1}{2} \end{pmatrix}$$

$$M = 3: M_3 = \begin{pmatrix} 1 & 0 \\ \frac{a+b+c}{2} & \frac{-1}{2} \end{pmatrix}$$

Examining the matrices $M_i$ (index i=0, 1, 2, or 3) defined in equations (7) it will be apparent that, for each matrix "$M_i$," the matrix elements comprising the first row in each matrix $M_i$ contain the values (1,0), and the left and right hand matrix elements comprising the second row contains the values corresponding to the coefficients of triples (1,1,1) and (a,b,c), respectively in equations (6). As will be made apparent below, the subscript "i" for each matrix corresponds to the binary-encoded value of the bit pattern "$b_{x-+1}b_x$" of bits of a subdivision triangle's identifier that are associated with a subdivision triangle associated with index $(t_1) \ldots (t_l) \ldots (t_n)$ at a particular subdivision level $$l = n - \frac{x}{2}.$$

In the general case, the triple (a,b,c) will not be a multiple of the triple (1,1,1) (reference equations (6)), that is, they are linearly independent, and so the triples (1,1,1) and (a,b,c) (reference equations (6) above) can be considered as bases of a form of pseudo-vector space. With that construction, the triple (1,1,1) will be deemed to be associated with a basis that will be labeled "$e_1$" and the triple (a,b,c) will be deemed to be associated with a basis that will be labeled "$e_0$," and the pseudo-vector $(e_1,e_0)^T$ (where "T" represents the transpose operation) can be formed. If the pseudo-vector $(e_1,e_0)^T$ is multiplied by matrices $M_i$ defined in equations (7), the following are obtained:

$$M_0 \begin{pmatrix} e_1 \\ e_0 \end{pmatrix} = \begin{pmatrix} 1 & 0 \\ \frac{a}{2} & \frac{1}{2} \end{pmatrix} \begin{pmatrix} e_1 \\ e_0 \end{pmatrix} \tag{8}$$
$$= \begin{pmatrix} e_1 \\ \frac{a}{2}e_1 + \frac{1}{2}e_0 \end{pmatrix} = \begin{pmatrix} (1,1,1) \\ \frac{a}{2}(1,1,1) + \frac{1}{2}(a,b,c) \end{pmatrix}$$
$$= \begin{pmatrix} (1,1,1) \\ \left(a, \frac{1}{2}a+\frac{1}{2}b, \frac{1}{2}a+\frac{1}{2}c\right) \end{pmatrix},$$

$$M_1 \begin{pmatrix} e_1 \\ e_0 \end{pmatrix} = \begin{pmatrix} 1 & 0 \\ \frac{b}{2} & \frac{1}{2} \end{pmatrix} \begin{pmatrix} e_1 \\ e_0 \end{pmatrix} \tag{9}$$
$$= \begin{pmatrix} e_1 \\ \frac{b}{2}e_1 + \frac{1}{2}e_0 \end{pmatrix} = \begin{pmatrix} (1,1,1) \\ \frac{b}{2}(1,1,1) + \frac{1}{2}(a,b,c) \end{pmatrix}$$
$$= \begin{pmatrix} (1,1,1) \\ \left(\frac{1}{2}a+\frac{1}{2}b, b, \frac{1}{2}b+\frac{1}{2}c\right) \end{pmatrix},$$

$$M_2 \begin{pmatrix} e_1 \\ e_0 \end{pmatrix} = \begin{pmatrix} 1 & 0 \\ \frac{c}{2} & \frac{1}{2} \end{pmatrix} \begin{pmatrix} e_1 \\ e_0 \end{pmatrix} \tag{10}$$
$$= \begin{pmatrix} e_1 \\ \frac{c}{2}e_1 + \frac{1}{2}e_0 \end{pmatrix} = \begin{pmatrix} (1,1,1) \\ \frac{c}{2}(1,1,1) + \frac{1}{2}(a,b,c) \end{pmatrix}$$
$$= \begin{pmatrix} (1,1,1) \\ \left(\frac{1}{2}a+\frac{1}{2}c, \frac{1}{2}b+\frac{1}{2}c, c\right) \end{pmatrix},$$

and $$M_3 \begin{pmatrix} e_1 \\ e_0 \end{pmatrix} = \begin{pmatrix} 1 & 0 \\ \frac{a+b+c}{2} & \frac{-1}{2} \end{pmatrix} \begin{pmatrix} e_1 \\ e_0 \end{pmatrix} \tag{11}$$
$$= \begin{pmatrix} e_1 \\ \frac{a+b+c}{2}e_1 + \frac{-1}{2}e_0 \end{pmatrix}$$
$$= \begin{pmatrix} (1,1,1) \\ \frac{a+b+c}{2}(1,1,1) + \frac{-1}{2}(a,b,c) \end{pmatrix}$$
$$= \begin{pmatrix} (1,1,1) \\ \left(\frac{1}{2}b+\frac{1}{2}c, \frac{1}{2}a+\frac{1}{2}c, \frac{1}{2}a+\frac{1}{2}b\right) \end{pmatrix}.$$

Examining the equations (8) through (11), it will be apparent that, in the pseudo-vector comprising the last line of each equation, the triple in the second row corresponds to the respective triple in equation (6). Thus, as indicated above in connection with equation (8), the multiplication of the pseudo-vector $(e_1,e_0)$ by the matrix $M_0$ that is associated with action M=0 provides, in the second row, the triple $$\left(a, \frac{1}{2}a+\frac{1}{2}b, \frac{1}{2}a+\frac{1}{2}c\right),$$

which, as described above in connection with the first line of equation (6), represents the barycentric coordinates $$(1,0,0), \left(\frac{1}{2}, \frac{1}{2}, 0\right) \text{ and } \left(\frac{1}{2}, 0, \frac{1}{2}\right)$$

of points A, D and E that define the first-level subdivision triangle 21(0). Similarly, as indicated above in connection with equation (9), the multiplication of the pseudo-vector $(e_1,e_0)$ by the matrix $M_1$ that is associated with action M=1 provides, in the second row, the triple $$\left(\frac{1}{2}a+\frac{1}{2}b, b, \frac{1}{2}b+\frac{1}{2}c\right),$$

which, as described above in connection with the second line of equation (6), represent the barycentric coordinates $$\left(\frac{1}{2}, \frac{1}{2}, 0\right), (0,1,0) \text{ and } \left(0, \frac{1}{2}, \frac{1}{2}\right)$$

of points D, B, and F that define the first-level subdivision triangle 21(1). Similarly, the triples in the second rows of the last lines of equations (10) and (11), which describes the multiplication of the pseudo-vector $(e_1,e_0)$ by the matrices $M_2$ and $M_3$ that are associated with actions M=2 and M=3, respectively, provide triples $$\left(\frac{1}{2}a+\frac{1}{2}c, \frac{1}{2}b+\frac{1}{2}c, c\right) \text{ and } \left(\frac{1}{2}b+\frac{1}{2}c, \frac{1}{2}a+\frac{1}{2}c, \frac{1}{2}a+\frac{1}{2}b\right),$$

which, in turn, represent the barycentric coordinates $$\left(\frac{1}{2}, 0, \frac{1}{2}\right), \left(0, \frac{1}{2}, \frac{1}{2}\right)$$

and (0,0,1) of points E, F and C, and $$\left(0, \frac{1}{2}, \frac{1}{2}\right), \left(\frac{1}{2}, 0, \frac{1}{2}\right) \text{ and } \left(\frac{1}{2}, \frac{1}{2}, 0\right)$$

of points F, E, and D, which define first-level subdivision triangles 21(2) and 21(3) respectively.

The creation of a set of second-level subdivision triangles 22($t_1$)($t_2$) in a first-level subdivision triangle 21($t_1$) can similarly be considered an action on the first-level subdivision triangle 21($t_1$), and the matrices $M_1$ can be used in a similar manner to obtain the coordinates of the points defining the second-level subdivision triangles 22($t_1$)($t_2$). This will be apparent from the following. For example, considering the second-level subdivision triangles 22(0)($t_2$) formed in first-level subdivision triangle 21(0), the matrices $M_0$ and $M_i$ (i=0, ... , 3) can be multiplied together and applied to the pseudo-vector ($e_1$,$e_0$) with following results:

$$M_0 M_0 \binom{e_1}{e_0} = \begin{pmatrix} 1 & 0 \\ \frac{a}{2} & \frac{1}{2} \end{pmatrix} \begin{pmatrix} 1 & 0 \\ \frac{a}{2} & \frac{1}{2} \end{pmatrix} \binom{e_1}{e_0} \quad (12)$$

$$= \begin{pmatrix} 1 & 0 \\ \frac{3a}{4} & \frac{1}{4} \end{pmatrix} \binom{e_1}{e_0}$$

$$= \binom{e_1}{\frac{3a}{4}e_1 + \frac{1}{4}e_2} = \binom{(1,1,1)}{\frac{3a}{4}(1,1,1)+\frac{1}{4}(a,b,c)}$$

$$= \binom{(1,1,1)}{\left(a, \frac{3}{4}a+\frac{1}{4}b, \frac{3}{4}a+\frac{1}{4}c\right)},$$

$$M_0 M_1 \binom{e_1}{e_0} = \begin{pmatrix} 1 & 0 \\ \frac{a}{2} & \frac{1}{2} \end{pmatrix} \begin{pmatrix} 1 & 0 \\ \frac{b}{2} & \frac{1}{2} \end{pmatrix} \binom{e_1}{e_0} \quad (13)$$

$$= \begin{pmatrix} 1 & 0 \\ \frac{2a+b}{4} & \frac{1}{4} \end{pmatrix} \binom{e_1}{e_2}$$

$$= \binom{e_1}{\frac{2a+b}{4}e_1 + \frac{1}{4}e_2}$$

$$= \binom{(1,1,1)}{\frac{2a+b}{4}(1,1,1)+\frac{1}{4}(a,b,c)}$$

$$= \binom{(1,1,1)}{\left(\frac{3}{4}a+\frac{1}{4}b, \frac{1}{2}a+\frac{1}{2}b, \frac{1}{2}a+\frac{1}{4}b+\frac{1}{4}c\right)},$$

-continued $$M_0 M_2 \binom{e_1}{e_0} = \begin{pmatrix} 1 & 0 \\ \frac{a}{2} & \frac{1}{2} \end{pmatrix} \begin{pmatrix} 1 & 0 \\ \frac{c}{2} & \frac{1}{2} \end{pmatrix} \binom{e_1}{e_0} = \begin{pmatrix} 1 & 0 \\ \frac{2a+c}{4} & \frac{1}{4} \end{pmatrix} \binom{e_1}{e_0} \quad (14)$$

$$= \binom{e_1}{\frac{2a+c}{4}e_1 + \frac{1}{4}e_2}$$

$$= \binom{(1,1,1)}{\frac{2a+c}{4}(1,1,1)+\frac{1}{4}(a,b,c)}$$

$$= \binom{(1,1,1)}{\left(\frac{3}{4}a+\frac{1}{4}c, \frac{1}{2}a+\frac{1}{4}b+\frac{1}{4}c, \frac{1}{2}a+\frac{1}{2}c\right)},$$

and $$M_0 M_3 \binom{e_1}{e_0} = \begin{pmatrix} 1 & 0 \\ \frac{a}{2} & \frac{1}{2} \end{pmatrix} \begin{pmatrix} 1 & 0 \\ \frac{a+b+c}{2} & \frac{-1}{2} \end{pmatrix} \binom{e_1}{e_0} \quad (15)$$

$$= \begin{pmatrix} 1 & 0 \\ \frac{3a+b+c}{4} & \frac{-1}{4} \end{pmatrix} \binom{e_1}{e_0}$$

$$= \binom{e_1}{\frac{3a+b+c}{2}e_1 + \frac{-1}{4}e_0}$$

$$= \binom{(1,1,1)}{\frac{3a+b+c}{4}(1,1,1)+\frac{-1}{4}(a,b,c)}$$

$$= \binom{(1,1,1)}{\left(\frac{1}{2}a+\frac{1}{4}b+\frac{1}{4}c, \frac{3}{4}a+\frac{1}{4}c, \frac{3}{4}a+\frac{1}{4}b\right)}.$$

Examining the equations (12) through (15), it will be apparent that, in the pseudo-vector comprising the last line of each equation, the triple in the second row provides the coordinates of the points defining the second-level subdivision triangles 22(0)(0), 22(0)(1), 22(0)(2) and 22(0)(3), respectively. For example, from equation (12), the triple $$\left(a, \frac{3}{4}a+\frac{1}{4}b, \frac{3}{4}a+\frac{1}{4}c\right)$$

represents the barycentric coordinates $$(1, 0, 0), \left(\frac{3}{4}, \frac{1}{4}, 0\right) \text{ and } \left(\frac{3}{4}, 0, \frac{1}{4}\right)$$

of the points A, H and I, respectively, which define the second-level subdivision triangle 22(0)(0). Similarly, the triple $$\left(\frac{3}{4}a+\frac{1}{4}b, \frac{1}{2}a+\frac{1}{2}b, \frac{1}{2}a+\frac{1}{4}b+\frac{1}{4}c\right)$$

from equation (13) represents the barycentric coordinates $$\left(\frac{3}{4}, \frac{1}{4}, 0\right), \left(\frac{1}{2}, \frac{1}{2}, 0\right) \text{ and } \left(\frac{1}{2}, \frac{1}{4}, \frac{1}{4}\right)$$

of points H, D and G, respectively, which define the second-level subdivision triangle 22(0)(1), the triple $$\left(\frac{3}{4}a + \frac{1}{4}c, \frac{1}{2}a + \frac{1}{4}b + \frac{1}{4}c, \frac{1}{2}a + \frac{1}{2}c\right)$$

from equation (14) represents the barycentric coordinates $$\left(\frac{3}{4}, 0, \frac{1}{4}\right), \left(\frac{1}{2}, \frac{1}{4}, \frac{1}{4}\right) \text{ and } \left(\frac{1}{2}, 0, \frac{1}{2}\right)$$

of points I, G and E which define the second-level subdivision triangle 22(0)(2), and the $$\text{triple } \left(\frac{1}{2}a + \frac{1}{4}b + \frac{1}{4}c, \frac{3}{4}a + \frac{1}{4}c, \frac{3}{4}a + \frac{1}{4}b\right)$$

from equation (15) represents the barycentric coordinates $$\left(\frac{1}{2}, \frac{1}{4}, \frac{1}{4}\right), \left(\frac{3}{4}, 0, \frac{1}{4}\right) \text{ and } \left(\frac{3}{4}, \frac{1}{4}, 0\right)$$

of points G, I and H, respectively, which define the second-level subdivision triangle 22(3).

As noted above, second level subdivision triangles 22($t_1$)($t_2$) can be formed in the first-level subdivision triangles 21(1), 21(2) and 21(3). In the case of second-level subdivision triangles 22(1)($t_2$) formed in first level subdivision triangle 21(1), the barycentric coordinates of the points defining the second-level subdivision triangles 22(1)($t_2$), relative to points A, B and C defining the upper-level triangle 20, can be determined using $$M_1 M_i \begin{pmatrix} e_1 \\ e_0 \end{pmatrix} (i = 0, \ldots, 3).$$

Similarly, in the case of second-level subdivision triangles 22(2)($t_2$) formed in first level subdivision triangle 21(2), the barycentric coordinates of the points defining the second-level subdivision triangles 22(2)($t_2$), relative to points A, B and C defining the upper-level triangle 20, can be determined using $$M_2 M_i \begin{pmatrix} e_1 \\ e_0 \end{pmatrix} (i = 0, \ldots, 3).$$

It will be appreciated that, for each value of index "i," the relative positions of the second-level subdivision triangles 22(1)($t_2$) and 22(2)($t_2$) in the first level subdivision triangles 21(1) and 21(2) will be the same as the positions of the second level subdivision triangles 22(0)($t_2$) in the first level subdivision triangle 21(0). That is, the for "i" equal to "zero,"

$$M_1 M_0 \begin{pmatrix} e_1 \\ e_0 \end{pmatrix} \text{ and } M_2 M_0 \begin{pmatrix} e_1 \\ e_0 \end{pmatrix}$$

provide the barycentric coordinates of the second-level subdivision triangles 22(1)(0) and 22(2)(2) (not shown in FIG. 2) comprising the upper half (as shown in FIG. 2) of the first-level subdivision triangles 21(1) and 21(2), respectively, which is the same position as second level subdivision triangle 22(0)(0) relative to first level subdivision triangle 21(0). Similarly, for "i" equal to "one,"

$$M_1 M_1 \begin{pmatrix} e_1 \\ e_0 \end{pmatrix} \text{ and } M_2 M_1 \begin{pmatrix} e_1 \\ e_0 \end{pmatrix}$$

provide the barycentric coordinates of the second-level subdivision triangles 22(1)(1) and 22(2)(1) (not shown in FIG. 2) toward the left of the lower half (as shown in FIG. 2) of the first-level subdivision triangles 21(1) and 21(2), respectively, which is the same position as second level subdivision triangle 22(0)(1) relative to first level subdivision triangle 21(1). Similarly for other values of index "i."

Similarly, in the case of second-level subdivision triangles 22(3)($t_2$) formed in first level subdivision triangle 21(3), the barycentric coordinates of the points defining the second-level subdivision triangles 22(3)($t_2$), relative to points A, B and C defining the upper-level triangle 20, can be determined using $$M_3 M_i \begin{pmatrix} e_1 \\ e_0 \end{pmatrix} (i = 0, \ldots, 3).$$

In this case, however, for "i" equal to "zero,"

$$M_3 M_0 \begin{pmatrix} e_1 \\ e_0 \end{pmatrix}$$

provides the barycentric coordinates of the points defining the second-level subdivision triangle 22(3)(0) comprising the lower half (as shown in FIG. 2) of the first-level subdivision triangle 21(3). Similarly, for "i" equal to "one," to "three,"

$$M_3 M_1 \begin{pmatrix} e_1 \\ e_0 \end{pmatrix}$$

provides the barycentric coordinates of the points defining the second-level subdivision triangle 22(3)(1), $$M_3 M_2 \begin{pmatrix} e_1 \\ e_0 \end{pmatrix}$$

provides the barycentric coordinates of the points defining the second-level subdivision triangle 22(3)(2), and $$M_3 M_3 \begin{pmatrix} e_1 \\ e_0 \end{pmatrix}$$

provides the barycentric coordinates of the points defining the second-level subdivision triangle 22(3)(3), as can be seen from the following:

$$M_3 M_0 \begin{pmatrix} e_1 \\ e_0 \end{pmatrix} = \begin{pmatrix} 1 & 0 \\ \frac{a+b+c}{2} & \frac{-1}{2} \end{pmatrix} \begin{pmatrix} 1 & 0 \\ \frac{a}{2} & \frac{1}{2} \end{pmatrix} \begin{pmatrix} e_1 \\ e_0 \end{pmatrix} \quad (16)$$

$$= \begin{pmatrix} 1 & 0 \\ \frac{a+2b+2c}{4} & \frac{-1}{4} \end{pmatrix} \begin{pmatrix} e_1 \\ e_0 \end{pmatrix}$$

$$= \begin{pmatrix} e_1 \\ \frac{a+2b+2c}{4} e_1 + \frac{-1}{4} e_2 \end{pmatrix}$$

$$= \begin{pmatrix} (1,1,1) \\ \frac{a+2b+2c}{4}(1,1,1) + \frac{-1}{4}(a,b,c) \end{pmatrix}$$

$$= \begin{pmatrix} (1,1,1) \\ \left( \frac{1}{2}b + \frac{1}{2}c,\ \frac{1}{4}a + \frac{1}{4}b + \frac{1}{2}c,\ \frac{1}{4}a + \frac{1}{2}b + \frac{1}{4}c \right) \end{pmatrix},$$

$$M_3 M_1 \begin{pmatrix} e_1 \\ e_0 \end{pmatrix} = \begin{pmatrix} 1 & 0 \\ \frac{a+b+c}{2} & \frac{-1}{2} \end{pmatrix} \begin{pmatrix} 1 & 0 \\ \frac{b}{2} & \frac{1}{2} \end{pmatrix} \begin{pmatrix} e_1 \\ e_0 \end{pmatrix} \quad (17)$$

$$= \begin{pmatrix} 1 & 0 \\ \frac{2a+b+2c}{4} & \frac{1}{4} \end{pmatrix} \begin{pmatrix} e_1 \\ e_2 \end{pmatrix}$$

$$= \begin{pmatrix} e_1 \\ \frac{2a+b+2c}{4} e_1 + \frac{-1}{4} e_2 \end{pmatrix}$$

$$= \begin{pmatrix} (1,1,1) \\ \frac{2a+b+2c}{4}(1,1,1) + \frac{-1}{4}(a,b,c) \end{pmatrix}$$

$$= \begin{pmatrix} (1,1,1) \\ \left( \frac{1}{4}a + \frac{1}{4}b + \frac{1}{2}c,\ \frac{1}{2}a + \frac{1}{2}c,\ \frac{1}{2}a + \frac{1}{4}b + \frac{1}{4}c \right) \end{pmatrix},$$

$$M_3 M_2 \begin{pmatrix} e_1 \\ e_0 \end{pmatrix} = \begin{pmatrix} 1 & 0 \\ \frac{a+b+c}{2} & \frac{-1}{2} \end{pmatrix} \begin{pmatrix} 1 & 0 \\ \frac{c}{2} & \frac{1}{2} \end{pmatrix} \begin{pmatrix} e_1 \\ e_0 \end{pmatrix} \quad (18)$$

$$= \begin{pmatrix} 1 & 0 \\ \frac{2a+2b+c}{4} & \frac{-1}{4} \end{pmatrix} \begin{pmatrix} e_1 \\ e_0 \end{pmatrix}$$

$$= \begin{pmatrix} e_1 \\ \frac{2a+2b+c}{4} e_1 + \frac{-1}{4} e_2 \end{pmatrix}$$

$$= \begin{pmatrix} (1,1,1) \\ \frac{2a+2b+c}{4}(1,1,1) + \frac{-1}{4}(a,b,c) \end{pmatrix}$$

$$= \begin{pmatrix} (1,1,1) \\ \left( \frac{1}{4}a + \frac{1}{2}b + \frac{1}{4}c,\ \frac{1}{2}a + \frac{1}{4}b + \frac{1}{4}c,\ \frac{1}{2}a + \frac{1}{2}b \right) \end{pmatrix},$$

and

-continued $$M_3 M_3 \begin{pmatrix} e_1 \\ e_0 \end{pmatrix} = \begin{pmatrix} 1 & 0 \\ \frac{a+b+c}{2} & \frac{-1}{2} \end{pmatrix} \begin{pmatrix} 1 & 0 \\ \frac{a+b+c}{2} & \frac{-1}{2} \end{pmatrix} \begin{pmatrix} e_1 \\ e_0 \end{pmatrix} \quad (19)$$

$$= \begin{pmatrix} 1 & 0 \\ \frac{a+b+c}{4} & \frac{1}{4} \end{pmatrix} \begin{pmatrix} e_1 \\ e_0 \end{pmatrix}$$

$$= \begin{pmatrix} e_1 \\ \frac{a+b+c}{4} e_1 + \frac{1}{4} e_0 \end{pmatrix}$$

$$= \begin{pmatrix} (1,1,1) \\ \frac{a+b+c}{4}(1,1,1) + \frac{1}{4}(a,b,c) \end{pmatrix}$$

$$= \begin{pmatrix} (1,1,1) \\ \left( \frac{1}{2}a + \frac{1}{4}b + \frac{1}{4}c,\ \frac{1}{4}a + \frac{1}{2}b + \frac{1}{4}c,\ \frac{1}{4}a + \frac{1}{4}b + \frac{1}{2}c \right) \end{pmatrix}.$$

Examining the equations (16) through (19), it will be apparent that, in the pseudo-vector comprising the last line of each equation, the triple in the second row provides the coordinates of the points defining the second-level subdivision triangles 22(3)(0), 22(3)(1), 22(3)(2) and 22(3)(3), respectively. For example, from equation (16), the triple $$\left( \frac{1}{2}b + \frac{1}{2}c,\ \frac{1}{4}a + \frac{1}{4}b + \frac{1}{2}c,\ \frac{1}{4}a + \frac{1}{2}b + \frac{1}{4}c \right)$$

represents the barycentric coordinates $$\left( 0, \frac{1}{2}, \frac{1}{2} \right), \left( \frac{1}{4}, \frac{1}{4}, \frac{1}{2} \right) \text{ and } \left( \frac{1}{4}, \frac{1}{2}, \frac{1}{4} \right)$$

of the points F, K and J, respectively, which define the second-level subdivision triangle 22(3)(0). Similarly, the triple $$\left( \frac{1}{4}a + \frac{1}{4}b + \frac{1}{2}c,\ \frac{1}{2}a + \frac{1}{2}c,\ \frac{1}{2}a + \frac{1}{4}b + \frac{1}{4}c \right)$$

from equation (17) represents the barycentric coordinates $$\left( \frac{1}{4}, \frac{1}{4}, \frac{1}{2} \right), \left( \frac{1}{2}, 0, \frac{1}{2} \right) \text{ and } \left( \frac{1}{2}, \frac{1}{4}, \frac{1}{4} \right)$$

of points K, E and G, respectively, which define the second-level subdivision triangle 22(3)(1), the triple $$\left( \frac{1}{4}a + \frac{1}{2}b + \frac{1}{4}c,\ \frac{1}{2}a + \frac{1}{4}b + \frac{1}{4}c,\ \frac{1}{2}a + \frac{1}{2}b \right)$$

from equation (18) represents the barycentric coordinates $$\left(\frac{1}{4}, \frac{1}{2}, \frac{1}{4}\right), \left(\frac{1}{2}, \frac{1}{4}, \frac{1}{4}\right) \text{ and } \left(\frac{1}{2}, \frac{1}{2}, 0\right)$$

of points J, G and D which define the second-level subdivision triangle 22(3)(2), and the triple $$\left(\frac{1}{2}a + \frac{1}{4}b + \frac{1}{4}c, \frac{1}{4}a + \frac{1}{2}b + \frac{1}{4}c, \frac{1}{4}a + \frac{1}{4}b + \frac{1}{2}c\right)$$

from equation (19) represents the barycentric coordinates $$\left(\frac{1}{2}, \frac{1}{4}, \frac{1}{4}\right), \left(\frac{1}{4}, \frac{1}{2}, \frac{1}{4}\right) \text{ and } \left(\frac{1}{4}, \frac{1}{4}, \frac{1}{2}\right)$$

of points G, J and K, respectively.

Barycentric coordinates of subdivision triangles at third and subsequent levels can be determined in a similar manner using matrices $M_0$ through $M_3$. That is, if a subdivision triangle is at the "n-th" subdivision level, the barycentric coordinates of the three points that define the subdivision triangle, relative to the upper-level triangle 20, can be recovered using $$M_{i_1}^1 \ldots M_{i_n}^n \begin{pmatrix} e_1 \\ e_0 \end{pmatrix},$$

where, for each matrix the superscript refers to the subdivision level 1, . . . , n, and the subscript refers to the particular matrix $M_i$ (i=0, 1, 2 or 3) that is to be applied for the respective subdivision level. As noted above, the subscript "i" for each matrix corresponds to the binary-encoded value of the bit pattern "$b_{x+1}b_x$" of a subdivision triangle's identifier that is associated with a subdivision triangle associated with index $(t_1) \ldots (t_l) \ldots (t_n)$ at a particular subdivision level $$l = n - \frac{x}{2}.$$

That is, for an identifier having a bit pattern $b_{2n} \ldots b_{x+1} b_x \ldots b_0$ (x=2n-2, 2n-4, . . . ) for a subdivision triangle at a particular "n-th" level, where $b_{x+1}b_x$ are the bits of the identifier associated with the portion of the subdivision triangle's index $(t_l)$, with the pair of bits in bit positions $b_{x+1}b_x$ of the index being associated with that subdivision level identifies which of matrices $M_i$ (reference equation (7)) is to be applied at that subdivision triangle in recovering the barycentric coordinates of the points defining the subdivision triangle.

The matrix product $M_{i_1}^1 \ldots M_{i_n}^n$ can be generated iteratively. Examining equations (8) through (19), it will be apparent that, if the result of multiplying the matrices through "l" subdivision levels is $$M_{i_1}^1 \ldots M_{i_l}^l = M^l = \begin{pmatrix} 1 & 0 \\ \frac{\alpha_l a + \beta_l b + \chi_l c}{2^l} & \frac{\pm 1}{2^l} \end{pmatrix}, \quad (20)$$

where the sign of the lower right-hand matrix element may be either positive or negative (the determination of the sign will be described below), if the matrix product $M^l$ multiplies matrix $M_0$, the result is $$M^l M_0 = \begin{pmatrix} 1 & 0 \\ \frac{\alpha_l a + \beta_l b + \chi_l c}{2^l} \pm \frac{a}{2^{l+1}} & \frac{\pm 1}{2^{l+1}} \end{pmatrix} \quad (21)$$

$$= \begin{pmatrix} 1 & 0 \\ \frac{(2\alpha_l \pm 1)a + 2\beta_l b + 2\chi_l c}{2^{l+1}} & \frac{\pm 1}{2^{l+1}} \end{pmatrix}.$$

It will be appreciated that, in equation (21), if there is to be a subsequent "l+2d" iteration, which will be the case if level $l+1 \neq n$, then $\alpha_{l+1} 2\alpha_l = 1$, $\beta_{l+1} = 2\beta$ and $\chi_{l+1} = 2\chi_l$ for use in the next "l+2d" iteration. Equation (21) indicates that the result is that, for the "l+1-st" iteration, (a) the values in the first row are unchanged, that is, the left-hand matrix element has the 6 value "one" and the right hand matrix element has the value "zero;"

(b) for the values in the second row, (i) the value of the left hand matrix element is the sum or the difference of the left hand matrix element generated during the "l-th" iteration, and $$\frac{a}{2^{l+1}};$$

if the sign of the matrix element on the right hand side of the second row of $M^1$ that was generated during the "l-th" iteration is positive, the result will be the sum, but if the sign of the matrix element on the right hand side of the second row generated during the "l-th" iteration is negative, the result will be the difference, and (ii) the value of the right hand matrix element is the product of the right hand matrix element generated during the "l-th" iteration and $$\frac{1}{2}.$$

Corresponding results will be generated for $M^l M_1$ and $M^l M_2$. Accordingly, with reference to the second row of equation (21), in the left-hand matrix element, the numerator is still a polynomial in "a," "b" and "c," and with the denominator the "l+1-st" power of "two." In addition, in the right-hand matrix element, the denominator is the "l+1-st" power of "two," and the sign will be the same as for the "l-th" iteration.

On the other hand, if the matrix product $M^l$ multiplies the matrix $M_3$, the result is $$M^l M_3 = \begin{pmatrix} 1 & 0 \\ \dfrac{\alpha_l a + \beta_l b + \chi_l c}{2^l} \pm \dfrac{a+b+c}{2^{l+1}} & \mp\dfrac{1}{2^{l+1}} \end{pmatrix} \quad (22)$$

$$= \begin{pmatrix} 1 & 0 \\ \dfrac{(2\alpha_l \pm 1)a + (2\beta_l \pm 1)b + (2\chi_l \pm 1)c}{2^{l+1}} & \mp\dfrac{1}{2^{l+1}} \end{pmatrix}.$$

It will be appreciated that, in equation (22), if there is to be a subsequent "l+2d" iteration, the $\alpha_{l+1}=2\alpha_l\pm 1$, $\beta_{l+1}=2\beta_l\pm 1$ and $\chi_{l+1}=2\chi_l$ for use in the next "l+2d" iteration. Equation (22) indicates that the result is that, for the "l+1-st" iteration, (c) the values in the first row are unchanged, that is, the left-hand matrix element has the value "one" and the right hand matrix element has the value "zero;"

(d) for the values in the second row, (i) the value of the left hand matrix element is either the sum or the difference of the left hand matrix element generated during the "l-th" iteration, and $$\dfrac{a+b+c}{2^{l+1}};$$

if the sign of the matrix element on the right hand side of the second row of $M^l$ generated during the "l-th" iteration is positive, the result will be the sum, but if the sign of the matrix element on the right hand side of the second row generated during the "l-th" iteration is negative, the result will be the difference, and (ii) the value of the right hand matrix element is the product of the right hand matrix element generated during the "l-th" iteration multiplied by $$\dfrac{-1}{2}.$$

Accordingly, with reference to the second row of equation (22), in the left-hand matrix element, the numerator is still a polynomial in "a," "b" and "c," and with the denominator the "l+1-st" power of "two." In addition, in the right-hand matrix element, the denominator is the "l+1-st" power of "two," and the sign will be the opposite as for the previous "l-th" iteration.

Thus, after all "n" iterations, the matrix product $M_{i_1}^1 \ldots M_{i_n}^n$ is given by $$M_{i_1}^1 \ldots M_{i_n}^n = \begin{pmatrix} 1 & 0 \\ \dfrac{\alpha_n a + \beta_n b + \chi_n c}{2^n} & \dfrac{\pm 1}{2^n} \end{pmatrix}, \quad (23)$$

where, in the second row, "$\alpha_n$," "$\beta_n$" and "$\chi_n$" in the left hand matrix element and the sign of the right hand matrix element are generated as described above in connection with equations (20) through (22).

Moreover, further examining equations (8) through (19), it will also be appreciated that, after the matrix product $M_{i_1}^1 \ldots M_{i_n}^n$ has been generated as described above in connection with equations (20) through (23), the left hand matrix element of the second row multiplies the basis vector $e_1$, that is "(1,1,1)," and the right hand matrix element multiplies the basis vector $e_0$, that is "(a,b,c)," and the products are combined. Comparing equations (8) through (19) and equations (6), the $e_1$ basis vector "(1,1,1)" enables a triple to be formed all of whose elements correspond to the left hand matrix element of the second row. That is, $$\left(\dfrac{\alpha_n}{2^n}a + \dfrac{\beta_n}{2^n}b + \dfrac{\chi_n}{2^n}c\right)(1,1,1) \rightarrow \begin{pmatrix} \dfrac{\alpha_n}{2^n}a + \dfrac{\beta_n}{2^n}b + \dfrac{\chi_n}{2^n}c, \dfrac{\alpha_n}{2^n}a + \\ \dfrac{\beta_n}{2^n}b + \dfrac{\chi_n}{2^n}c, \dfrac{\alpha_n}{2^n}a + \dfrac{\beta_n}{2^n}b + \dfrac{\chi_n}{2^n}c \end{pmatrix} \quad (24)$$

The $e_0$ basis vector "(a,b,c)" enables the right hand matrix element of the second row to be added to the "a" term of the first element of the triple, the "b" term of the second element of the triple, and the "c" term of the third element of the triple, that is $$\begin{pmatrix} \dfrac{\alpha_n}{2^n}a + \dfrac{\beta_n}{2^n}b + \dfrac{\chi_n}{2^n}c, \dfrac{\alpha_n}{2^n}a + \\ \dfrac{\beta_n}{2^n}b + \dfrac{\chi_n}{2^n}c, \dfrac{\alpha_n}{2^n}a + \dfrac{\beta_n}{2^n}b + \dfrac{\chi_n}{2^n}c \end{pmatrix} \pm \dfrac{1}{2^n}(a,b,c) \rightarrow \quad (25)$$

$$\begin{pmatrix} \dfrac{\alpha_n \pm 1}{2^n}a + \dfrac{\beta_n}{2^n}b + \dfrac{\chi_n}{2^n}c, \dfrac{\alpha_n}{2^n}a + \dfrac{\beta_n \pm 1}{2^n}b + \\ \dfrac{\chi_n}{2^n}c, \dfrac{\alpha_n}{2^n}a + \dfrac{\beta_n}{2^n}b + \dfrac{\chi_n \pm 1}{2^n}c \end{pmatrix},$$

as is evident from equations (6), with the sum being used if the sign of the right hand matrix element of the second row of the matrix product $M_{i_1}^1 \ldots M_{i_n}^n$ is positive, and the difference being used if the sign is negative. Examining equation (25), it will be appreciated that the barycentric coordinates of the points defining the subdivision triangle, relative to the upper level triangle 20, correspond to $$\left(\dfrac{\alpha_n \pm 1}{2^n}, \dfrac{\beta_n}{2^n}, \dfrac{\chi_n}{2^n}\right), \left(\dfrac{\alpha_n}{2^n}, \dfrac{\beta_n \pm 1}{2^n}, \dfrac{\chi_n}{2^n}\right) \text{ and } \left(\dfrac{\alpha_n}{2^n}, \dfrac{\beta_n}{2^n}, \dfrac{\chi_n \pm 1}{2^n}\right).$$

It will be appreciated that, in view of the discussion above in connection with equations (21) and (22), it is unnecessary to generate the actual matrix products $M^l$, but instead it will be sufficient to generate the values for the matrix elements for the second row. This can also be accomplished in an iterative manner, as will be described below.

As noted above, an identifier $b_{2n} \ldots b_0$ can be stored as a fixed-length word in the computer graphics system 10. In that case, the word in which the identifier is stored can have one or more high-order bits (that is, bits in bit positions $b_{msb} \ldots b_{2n+1}$ (where "msb" refers to "most significant bit") to the "left" of bit $b_{2n}$ in the word) all of which have the value "zero," followed by the bits in bit positions $b_{2n} \ldots b_0$ comprising the identifier itself. The bit in bit position $b_{2n}$, which, as described above, always has the value "one," will identify the high-order bit of the identifier. The binary-encoded value of each subsequent pair of bits "$b_{2n-1}b_{2n-2}$," "$b_1 b_0$" in the identifier will identify the particular matrix $M_i$ (equations (7)) that is to be applied for a particular subdivision level to facilitate the recovery of the barycentric coordinates, relative to the upper level triangle 20, of the subdivision triangle that is associated with the identifier. In determining the barycentric coordinates, the computer graphics system 10 can make use of variables, represented here by "a," "b" and "C," "sign" and an iteration index "i." The variables "a," "b" and "c" will be used to keep track of the values of the coefficients "$\alpha_1$," "$\beta_1$," and "$\chi_1$," respectively, for the left-hand matrix of the second row of the matrix $M^l$. The variable "sign" will be used to keep track of the sign of the right-hand element in the second row of the matrix $M^l$. If the value of the variable "sign" is positive "one," the sign of the matrix element is positive, and if the value of the variable "sign" is a negative "one, the sign of the matrix element is negative. It will be appreciated that the number of iterations will correspond to the number "n" of subdivision levels. The computer graphics system will initialize the variables "a," "b" and "c" to the value "zero," and the variable "sign" to positive "one." After determining the number "n" of subdivision levels, the computer graphics system will initialize the iteration index "i" to "n−1." It will be appreciated that, after initialization, "2i" identifies the bit position $b_{2n-2}$, which, in turn, corresponds to the low-order bit of the pair of bits $b_{2n-1}b_{2n-2}$ corresponding to the index $t_1$ of the subdivision triangle.

During each of "n" iterations the computer graphics system 10 performs several operations, namely (i) using the binary-encoded value of the pair of bits in bit positions $b_{2i+1}b_{2i}$ that are associated with the subdivision level, the computer graphics system 10 determines which of the matrices $M_0$, $M_1$, $M_2$ or $M_3$ (reference equations (7)) is to be associated with the iteration;

(ii) the computer graphics system 10 updates the appropriate variable "a," "b" and/or "c" based on the determination in step (i), that is, (A) if the computer graphics system determines in step (i) that the matrix $M_0$, $M_1$ or $M_2$ is to be applied during the iteration, which will be the case if the binary-encoded value of the bits $b_{2i+1}b_{2i}$ is zero, one or two, respectively, the computer graphics system updates variable "a," "b" or "c," respectively by adding the value $$\text{``}\frac{\text{sign}}{2^{n-i}}\text{''}$$

thereto (reference item (b)(i) immediately above, recognizing that the value of the exponent "n−i" in the denominator here corresponds to the value of exponent "l+1" in the denominator of item (b)(i) immediately above), but (B) if the computer graphics system determines in step (i) that the matrix $M_3$ is to be applied for the iteration, which will be the case if the binary-encoded value of the bits $b_{2i+1}b_{2i}$ is "three," the computer graphics system (I) updates all three variables "a," "b" and "c" by adding to each the value $$\text{``}\frac{\text{sign}}{2^{n-i}}\text{''}$$

(reference item (d)(i) immediately above), and (II) updates the variable "sign" by multiplying it by "−1," that is, by complementing the sign (this will be used in connection with item (d)(ii) immediately above);

(iii) the computer graphics system decrements the index "i" and, if the value of index "i" is positive or zero, it returns to step (i), but if the value of index "i" is less than zero, it proceeds to step (iv); it will be appreciated that, if the value of index "i" is positive or zero, "2i" identifies the bit position of the low-order bit $b_{2n-4}$, $b_{2n-6}$ ... $b_0$ of the bit pair $b_{2i+1}b_{2i}$ corresponding to the index $t_2$, $t_3$, ... $t_n$ of the subdivision triangle.

After the computer graphics system has performed steps (i) through (iii) through the "n" iterations, referencing equation (23), the values of variables "a," "b" and "c" will correspond to the values of $$\text{``}\frac{\alpha_n}{2^n}\text{,''} \text{``}\frac{\beta_n}{2^n}\text{''} \text{ and } \text{``}\frac{\chi_n}{2^n}\text{,''}$$

respectively. Thereafter, the computer graphics system combines the information related to the left and right hand matrix elements of the second row of the matrix product $M_{i_1}^{\ 1} \ldots M_{i_n}^{\ n}$ to generate the barycentric coordinates, as follows:

(iv) the computer graphics system generates a value for a variable "size" as "$2^n$,"

(v) the computer graphics system generates a triple $$\left(\frac{\alpha_n}{2^n}, \frac{\beta_n}{2^n}, \frac{\chi_n}{2^n}; \frac{\alpha_n}{2^n}, \frac{\beta_n}{2^n}, \frac{\chi_n}{2^n}; \frac{\alpha_n}{2^n}, \frac{\beta_n}{2^n}, \frac{\chi_n}{2^n}\right)$$

(the semi-colons delimiting the three elements of the triple) using the values for "a," "b" and "c" generated in steps (i) through (iii) (reference equation (24) above); and (vi) the computer graphics system adds the value $$\text{``}\frac{\text{sign}}{\text{size}}\text{'' to ``}\frac{\alpha_n}{2^n}\text{''}$$

in the first element of the triple, to $$\text{``}\frac{\beta_n}{2^n}\text{''}$$

in the second element of the triple, and to $$\text{``}\frac{\chi_n}{2^n}\text{''}$$

in the third element of the triple (reference equation (25) above), thereby to combine the two matrix elements comprising the second row.

It will be appreciated that "$2^n$," the value of variable "size," that is generated in step (iv) above corresponds to the denominator in the right hand matrix element in the second row of the matrix product $M_{i_1}^{\ 1} \ldots M_{i_n}^{\ n}$. Similarly, the value of "sign," which may be either "positive one" or "negative one" at the end of the iterations described above in connection with steps (i) through (iii), corresponds to the numerator of the right hand matrix element of the matrix product $M_{i_1}^{\ 1} \ldots M_{i_n}^{\ n}$. Thus, adding the value "$\frac{\text{sign}}{\text{size}}$"

in step (vi) is corresponds to adding the value $\frac{1}{2^n}$ to "$\frac{\alpha_n}{2^n}$"

in the first element of the triple, to

"$\frac{\beta_n}{2^n}$"

in the second element, and to

Figure 3:
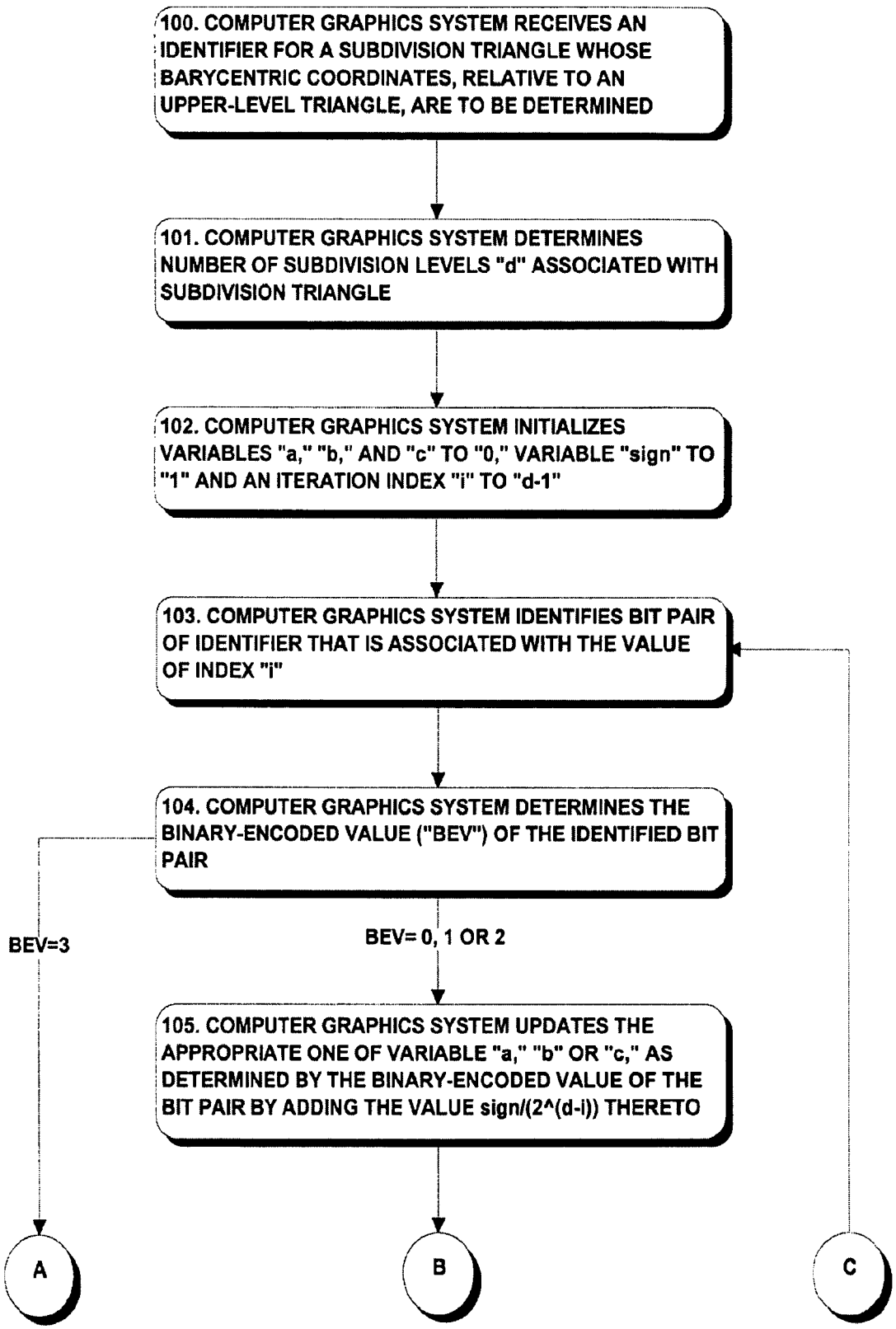
FIG. 3 is a flow chart depicting operations performed by the computer graphics system in connection with determining barycentric coordinates, relative to an upper level triangular surface element, of a subdivision surface, using an identifier for the respective subdivision surface.
Figure 3A:
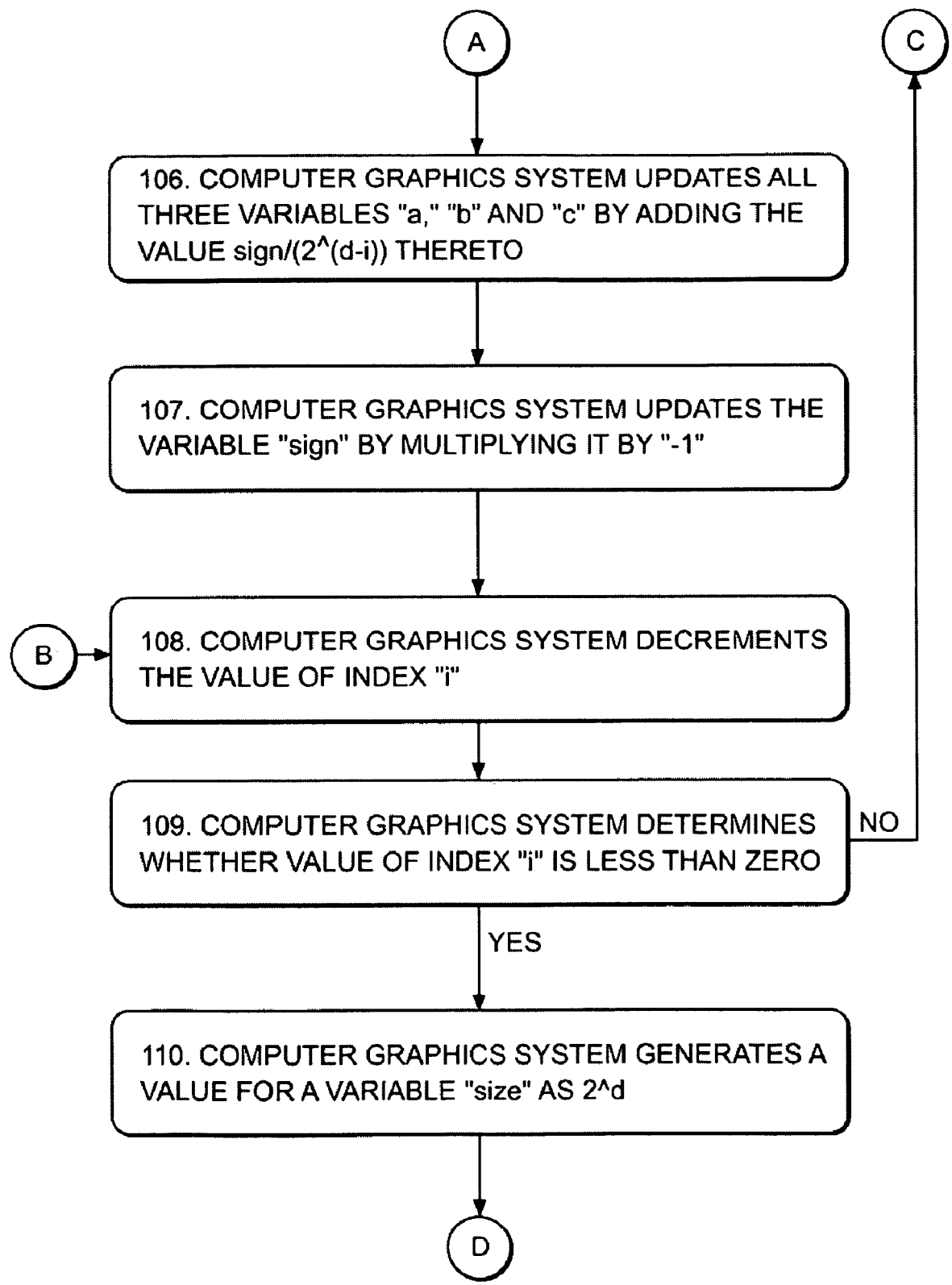

"$\frac{\chi_n}{2^n}$"

in the third element if the value of "sign" is positive, and subtracting the value $\frac{1}{2^n}$ if the value of "sign" is negative, as described above in connection with equation (25). Accordingly, step (vi) corresponds to the step of combining the two matrix elements in the second row, as described above in connection with equation (25). Thus, the result following step (vi) is the triple that defines the barycentric coordinates $\left( \frac{\alpha_n \pm 1}{2^n}, \frac{\beta_n}{2^n}, \frac{\chi_n}{2^n} \right)$ comprising the first element of the triple, $\left( \frac{\alpha_n}{2^n}, \frac{\beta_n \pm 1}{2^n}, \frac{\chi_n}{2^n} \right)$ comprising the second element of the triple, and $\left( \frac{\alpha_n}{2^n}, \frac{\beta_n}{2^n}, \frac{\chi_n \pm 1}{2^n} \right)$ comprising the third element of the triple, relative to the upper level triangle 20, of the three points defining the subdivision triangle associated with the respective identifier. FIG. 3 is a flow chart depicting operations performed by the computer graphics system in connection with the steps (i) through (vi) described above.

As noted above, in one particular embodiment, instead of performing the specific operations described above in connection with steps (i) through (iii), which would require use of floating-point arithmetic, the computer graphics system 10 can make extensive use of integer arithmetic, which can simplify the operations and speed up processing during those steps. Since $\frac{\text{sign}}{2^{n-i}} = \frac{1}{2^n} \text{sign} * 2^i$, and since the value of divisor "$2^n$" depends only on "n," the number of subdivision levels, instead of adding the value "$\frac{\text{sign}}{2^{n-i}}$"

during each iteration, which would require that the variables "a," "b" and "c" be floating point numbers and floating-point arithmetic be used to generate the value "$\frac{\text{sign}}{2^{n-i}}$"

for addition to the respective variable(s), the computer graphics system can add the value "sign*$2^i$" to the respective variable(s) during each iteration. It will be appreciated that "sign*$2^i$" is an integer, in which case the variables "a," "b" and "c" can be integers and the iterations can be performed using integer arithmetic. It will also be appreciated that "$2^n$" corresponds to the value of the variable "size," which is generated in step (iv). Accordingly, after the computer graphics system 10 has completed the "n" iterations, it can generate the value for variable "size" (step (iv)), divide the variables "a," "b" and "c" by the value of that variable "size," and proceed to step (v). In that case, only steps (v) and (vi) would make use of floating point arithmetic.

Code Segment 1 depicts a code segment in the C programming language for generating the barycentric coordinates of a subdivision triangle with the above considerations.

| Code Segment 1 |
| --- |
| (1) sign = 1 |
| (2) a = b = c = 0 |
| (3) for (i = n−1; i >= 0; i−−) { |
| (4)    switch ((code>>(i<<1))&3) { |
| (5)       case 0: |
| (6)          a += sign*(1<<i) |
| (7)          break; |
| (8)       case 1: |
| (9)          b += sign*(1<<i) |
| (10)          break; |
| (11)       case 2: |
| (12)          c += sign*(1<<i) |
| (13)          break; |
| (14)       case 3: |
| (15)          a +=sign*(1<<i) |
| (16)          b += sign*(1<<i) |
| (17)          c += sign*(1<<i) |
| (18)          sign *= (−1); |
| (19)          break; |
| } |

31

-continued

Code Segment 1

```
     }
(20)     size = 1<<n
(21)         bary_0_a = bary_1_a = bary_2_a = a/size;
(22)         bary_0_b = bary_1_b = bary_2_b = b/size;
(23)         bary_0_c = bary_1_c = bary_2_c = c/size;
(24)         bary_0_a += sign/size;
(25)         bary_1_b += sign/size;
(26)         bary_2_c += sign/size;
```

In Code Segment 1, it is assumed that a word "code" has been provided to the computer graphics system. The word "code" comprises a multiple-bit word including an identifier for the subdivision triangle whose barycentric coordinates are to be generated in bit positions $b_{2n} \ldots b_0$. The word "code" may also have bits in more significant bit positions $b_{msb} \ldots b_{2n+1}$ (where "msb" refers to "most significant bit" of the word), all of which have the value "zero." It is also assumed in Code Segment 1 that the bit position "2n" of the highest-order bit $b_{2n}$ in the word "code" that has the value "one" has been determined. Further it is assumed in Code Segment 1 that "n," the number of subdivision levels, has also been determined. It will be appreciated that the number of subdivision levels "n" can be determined in relation to the bit position $b_{2n}$ of the highest order bit that has the 6 value "one."

With reference to the Code Segment 1, lines (1) and (2) enable the variable "sign" and the 8 variables "a," "b" and "c" to be initialized.

The portion of Code Segment 1 comprising lines (3) through (19) relates to steps (i) through (iii) described above. As will be apparent to those skilled in the art, the portion of Code Segment comprising lines (3) through (19) can be performed using integer arithmetic. As noted above, steps (i) through (iii) are performed in a loop comprising one or more iterations, and Line (3) is the beginning of the loop. The loop is indexed by variable "i," and in line (3), the portion "i=n−1" enables the variable "i" to be initialized to correspond to "n−1." As noted above, "n" corresponds to the number of subdivision levels for the subdivision triangle that is associated with the identifier that is contained in the word "code." The "i−−" portion of line (3) enables the value of variable "i" to be decremented by "one" at the end of each iteration. The "i>=0" portion of line (3) specifies the loop termination criterion, as will be described below.

Line (4) controls the selection of one of four code fragments, identified as "case 0" comprising lines (5) through (7), "case 1" comprising lines (8) through (10), "case 2" comprising lines (11) through (13), and case (3) comprising lines (14) through (19), that is to be executed during the respective "i-th" iteration. It will be appreciated that, in each "case c," (c=0, 1, 2 or 3) the value of "c" corresponds to the binary-encoded value of a bit pair $b_{x+1}b_x$ from the word "code" that will be used for the iteration. As will be clear from the following, in each "case c," the value of "c" is associated with the value of the subscript of the particular matrix $M_c$ (reference equations (7)) that is to be applied during the iteration. If the binary-encoded value of the bit pair $b_{x+1}b_x$ is "zero", the code fragment "case 0" is to be executed during the iteration; if the binary-encoded value is "one," code fragment "case 1" is to be executed during the iteration; if the binary-encoded value is "two," code fragment "case 2" is to be executed during the iteration; and, if the binary-encoded value is "three," code fragment "case 3" is to be executed during the iteration.

32

Line (4) controls the selection of the code fragment that is to be executed in the following manner. First, the "i<<1" portion of line (4) enables the bits of the word defining the loop index "i" to be shifted to the left, that is, toward more significant bit positions, by one bit position. This serves to multiply the value of "i" by "two." As noted above, "i" initialized to "n−1," which is "one" less than the number "n" of subdivision levels associated with the subdivision triangle whose barycentric coordinates are to be determined. Thus, if the number of subdivision levels associated with a subdivision triangle is fifteen, the value of "i" will be initialized to fourteen for use during the first iteration. In that case, the "i<<1" portion of line (4) will provide the value "twenty-eight." Similarly, if the value of "i" is thirteen, the "i<<1" portion of line (4) would provide the value "twenty-six." This may occur if, for example, the subdivision triangle is at level fourteen, in which case the value of "i" will be initialized at the value "thirteen" for use during the first iteration. On the other hand, this may occur if, for example, the subdivision triangle is at level 15 and the value of "i," after being initialized at the value "fourteen," has been decremented to the value "thirteen" for use during a second iteration. Corresponding values will be generated for the "i<<1" portion of line (4) for various values of "i."

As noted above, the word "code" refers to the word containing the identifier for the subdivision triangle. Continuing with line (4), the "code>>" portion of line (4) enables the bits of the word "code," including the identifier, to be shifted to the right, that is, toward less-significant bit positions. The number of bit positions that the bits will be shifted corresponds to the value generated in response to the "i<<1" portion of line (4). Thus, if, for example, the value of "i" is fourteen, which may occur if, as noted above, the number of levels associated with the subdivision triangle is fifteen, the "code>>" portion of line (4) enables the word "code" to be shifted twenty-eight bit positions toward the right. In that case, the bits that were originally in bit positions $b_{29}b_{28}$ in the word "code" containing the identifier will be shifted to bit positions $s_1s_0$ in the shifted word. It will be appreciated that these bits will correspond to the $(t_1)$ portion of the identifier for a subdivision triangle at subdivision level fifteen. In addition, the bit that was originally in bit position $b_{30}$, which corresponds to the high-order bit of the word "code" containing the identifier, which indicates the start of the identifier, will be shifted to bit position $s_2$ in the shifted word. The bits that were originally in bit positions $b_{27} \ldots b_0$ of the word "code" will be shifted out and will not be represented in the shifted word. Generally, the bits in bit positions $s_{msb} \ldots s_3$ (where "msb" refers to "most significant bit") of the shifted word will all have the value "zero," that is, bits having the value "zero" will be shifted into the more significant bit positions as the shift occurs, although since, as will be described below, the shifted word is subsequently bit-wise ANDED with a mask word, the bits in bit positions $s_{msb} \ldots s_3$ of the shifted word may take on any value.

On the other hand, if the value of "i" is thirteen, the bits that were originally in bit positions $b_{27}b_{26}$ of the word "code" containing the identifier, will be shifted to bit positions $s_1s_0$ in the shifted word. It will be appreciated that these bits correspond to the $(t_1)$ portion of the identifier for a subdivision triangle at subdivision level fourteen, and the $(t_2)$ portion of the identifier for a subdivision triangle at subdivision level fifteen. If the subdivision triangle is at subdivision level fourteen, the high-order bit of the identifier, which indicates the start of the identifier, was originally in bit position $b_{28}$ of the word "code" and will be shifted to bit position $s_2$ of the shifted word. On the other hand, if the subdivision triangle is at subdivision level fifteen, the high-order bit of the identifier, which was originally in bit position $b_{30}$ of the word "code" will be shifted to bit position $s_4$ of the shifted word, and the bits of the identifier that were originally in bit position $b_{29}b_{28}$ in the word "code," which correspond to the $(t_1)$ portion of the identifier, will be shifted to bit positions $s_3s_2$ of the shifted word. The bits that were originally in bit positions $b_{25} \ldots b_0$ will be shifted out and will not be represented in the shifted word. Generally, the bits in bit positions $s_{msb} \ldots s_5$ of the shifted word will all have the value "zero," that is, bits having the value "zero" will be shifted into the more significant bit positions as the shift occurs, although since, as will be described below, the shifted word is subsequently bit-wise ANDED with a mask word, the bits in bit positions $s_{msb} \ldots s_5$ of the shifted word may take on any value.

The "code>>" portion of line (4) will enable similar shifts of the word "code" to occur for various values of "i."

Finally, the "&3" portion of line (4) enables the shifted word to be bit-wise ANDed with a mask word that comprises bits whose binary-encoded value has the value "three." It will be appreciated that such a mask word has bits in the least significant bit positions $m_1m_0$ both of which have the value "one," with the bits in the higher-order bit positions $m_{msb} \ldots m_2$ ("msb" referring to "most significant bit" position) all having the value "zero." This operation serves to produce a masked word whose least significant bit positions $w_1w_0$ correspond to bits in bit positions $s_1s_0$ of the shifted word, with the bits in the higher-order bit positions $w_{msb} \ldots w_2$ all having the value "zero." This serves to mask, that is, set to "zero," any bits in bit positions $s_{msb} \ldots s_2$ of the shifted word, which may comprise, for example, the bit $b_n$ that indicates the beginning of the identifier, and bits in bit positions that are associated with indices $t_1, t_2 \ldots$ for any subdivision levels that have already been processed, as well as any non-zero bits that may have been shifted into the shifted word.

It will be appreciated that the masked word has a binary-encoded value of one of "zero," "one," "two," or "three." That binary-encoded value corresponds to the value of "c" in "case c" described above, and is used to select one of the code fragments "case 0" comprising lines (5) through (7), "case 1" comprising lines (8) through (10), "case 2" comprising lines (11) through (13), and "case 3" comprising lines (14) through (19), that will be executed during the respective iteration. Line (4) enables the operations described above to occur during each iteration, for each subdivision level of the subdivision triangle.

As noted above, during each iteration, line (4) enables one of the four code fragments to be selected for processing during the iteration based on the binary-encoded value of the bits in bit positions $w_1w_0$ of the masked word. As described above, the bits in bit positions $w_1w_0$ of the masked word correspond to the bits in bit positions $b_{x+1}b_x$ of the word "code," which, in turn, correspond to the index $(t_{i+1})$ that is associated with the current "+1-st" subdivision level for the iteration. Thus, if the binary-encoded value of the bits in bit positions $b_{x+1}b_x$ associated with the current subdivision level is "zero," code fragment "case 0" is executed. In case 0, the portion of line (6)"1<<i" enables the value "$2^i$" to be generated. In that operation, the "1<<i" portion enables a word to be generated whose binary-encoded value is "one," after which the word is shifted to the left, that is, toward more significant bit positions, by "i" bit positions. It will be appreciated that the word whose binary-encoded value is "one" will have a bit in the least-significant bit position with the value "one," with the bits in the other bit positions having the value "zero." As the bit with the value "one" is shifted to each successive higher-order bit position, the binary-encoded value contained in the shifted word is multiplied by "two," so that, after the bit has been shifted by "i" bit positions, the binary-encoded value contained in the shifted word is "$2^i$." The "sign*" portion of line (6) enables the "$2^i$" to be multiplied by the current value of the variable "sign," thereby to generate the value "sign*$2^i$" and the "a+=" portion of line (6) enables that value "sign*$2^i$" to be added to the current value of variable "a."

Similarly, if the binary-encoded value of the bits in bit positions $b_{x+1}b_x$ is "one," the "case 1" is executed, in which line (9) enables the value "$2^i$" to be generated and multiplied by the current value of the variable "sign," and the result added to the current value of variable "b." Continuing, if the binary-encoded value of the bits in bit positions $b_{x+1}b_x$ is "two," the "case 2" is executed, in which line (12) enables the value "$2^i$" to be generated and multiplied by the current value of the variable "sign," and the result added to the current value of variable "c." The operations that are enabled by the respective code fragments "case 0," "case 1" and "case 2" update the values of variables "a," "b" and "c," respectively, as described above in connection with equation (21), in particular the left-hand matrix element of the second row, with the proviso that the common factor $$"\frac{1}{2^n}"$$

has yet to be applied.

If the binary-encoded value of the bits in bit positions $b_{x+1}b_x$ is "three," the code fragment "case 3" is executed. In that code fragment, the value "$2^i$" is multiplied by the current value of the variable "sign," with the result being added to the current values of all variables "a," "b" and "C" (reference lines (15) through (17)). Thereafter, the value of the variable "sign" is negated (reference line (18)) for use in the next iteration, if any. Code fragment "case 3" updates the values of variables "a," "b," "c" and "sign" as described above in connection with equation (22), in particular the left-hand matrix element of the second row, also with the proviso that the common factor $$"\frac{1}{2^n}"$$

has yet to be applied.

As noted above, line (3) controls the Code Segment 1 to enable the operations described above in connection with lines (4) through (19) to be executed through a number of iterations, the number corresponding to the number of subdivision levels associated with the subdivision triangle associated with "code." Returning to line (3), and as noted above, line (3) enables the variable "i" to be initialized to correspond to "n−1," that is, "one" less than the number "n" of subdivision levels associated with the word "code," and the value of variable "i" to be decremented by "one" at the end of each iteration. Accordingly, if, for example, the word "code" is associated with a subdivision triangle at level fifteen, for the fifteen iterations the value of "i" will sequence from "fourteen" to through "zero," At the end of the fifteenth iteration, the value of "i" will be decremented to "negative one." On the other hand, if the word "code" is associated with a subdivision triangle at level fourteen, for the fourteen iterations the value of "i" will sequence from "thirteen" through "zero," and similarly with subdivision triangles at other subdivision levels. The portion of line (3) "i>=0", which, as noted above, specifies the loop termination criterion, indicates that iterations are to be performed while the value of "i" is either positive or zero, and so, when, in the "n-th" iteration, "i" is decremented to a value below "zero," line (3) enables iterations to cease. At that point, control will sequence to line (20) of Code Segment 1.

The portion of Code Segment 1 comprising lines (20) through (26) relates to steps (iv) through (vi) described above, and is the only portion of the Code Segment 1 that makes use of floating-point arithmetic. Line (20) of Code Segment 1 enables the generation of the common divisor "2," which is assigned to the variable "size." Lines (21) through (23) of Code Segment 1 enable the initialization of the components of the triple that is to be generated for the barycentric coordinates of the points defining the subdivision triangle. Line (21) enables the first "$\alpha$"-related component of all of the elements of the triple to be initialized, line (22) enables the second "$\beta$"-related component of all of the elements to be initialized and line (23) enables the third "$\chi$"-related component of all of the elements to be initialized. As is apparent from the description above relating to the second lines of equations (8) through (19), in particular the portion relating to the portion of the computation associated with the basis vector $e_1=(1,1,1)$ described above in connection with equation (24), the portion relating to the computation with basis vector $e_1=(1,1,1)$ provides a triple comprising three elements, all of which have the same value for the first component, the same value for the second component and the same value for the third component. Variables bary_0_a, bary_1_a and bary_2_a comprise the first component (referred to as $$"\frac{\alpha_n}{2^n}"$$

above in connection with equation (24)) of the first, second and third element, respectively, of the triple. Similarly, bary_0_b, bary_1_b and bary_2_b comprise the second component (referred to as $$"\frac{\beta_n}{2^n}"$$

above in connection with equation (24)) of the first, second and third element, respectively, of the triple, and bary_0_c, bary_1_c and bary_2_c comprise the third component (referred to as $$"\frac{\chi_n}{2^n}"$$

above in connection with equation (24)) of the first, second and third element, respectively, of the triple, thereby facilitating the performance of step (v) noted above.

Lines (24) through (26) of Code Segment 1 enable the values of the triples that were initialized in lines (21) through (23) to be combined with the portion of equations (8) through (19) relating to the additional computation with basis vector $e_0=(a,b,c)$. In that computation, as described above in connection with equation (25), the value $$"\frac{sign}{size}"$$

is added to the first component of the first element of the triple, the second component of the second element of the triple, and the third component of the third element of the triple, thereby facilitating the performance of step (vi) noted above. Thus, since the value of "sign" is either positive or negative "one," the result after execution of lines (24) through (26) are values that define the barycentric coordinates $$(\text{bary\_0\_a}, \text{bary\_0\_b}, \text{bary\_0\_c}) = \left(\frac{\alpha_n \pm 1}{2^n}, \frac{\beta_n}{2^n}, \frac{\chi_n}{2^n}\right),$$

$$(\text{bary\_1\_a}, \text{bary\_1\_b}, \text{bary\_1\_c}) = \left(\frac{\alpha_n}{2^n}, \frac{\beta_n \pm 1}{2^n}, \frac{\chi_n}{2^n}\right)$$

and $$(\text{bary\_2\_a}, \text{bary\_2\_b}, \text{bary\_2\_c}) = \left(\frac{\alpha_n}{2^n}, \frac{\beta_n}{2^n}, \frac{\chi_n \pm 1}{2^n}\right),$$

relative to the upper level triangle 20, of the three points defining the subdivision triangle associated with the identifier in that was provided in the variable "code." It will be appreciated that (i) for the point whose barycentric coordinates are (bary_0_a, bary_0_b, bary_0_c)

(a) for the subdivision triangles, such as triangles 21(0), 21(2) and 21(3) that have the same alignment as the upper level triangle 20, the point will be at the top of the respective triangle, such as points A in triangle 21(0), D in triangle 21(1) and E in triangle 21(2), but (b) for the subdivision triangles, such as triangle 21(3) that has an alignment rotated one hundred and eighty degrees relative to the upper level triangle 20, the point will be at the bottom of the respective triangle, such as point F in subdivision triangle 21(3);

(ii) for the point whose barycentric coordinates are (bary_1_a, bary_1_b, bary_1_c)

(a) for the subdivision triangles, such as triangles 21(0), 21(2) and 21(3) that have the same alignment as the upper level triangle 20, the point will be at the lower left of the respective triangle, such as points D in triangle 21(0), B in triangle 21(1) and F in triangle 21(2), but (b) for the subdivision triangles, such as triangle 21(3) that has an alignment rotated one hundred and eighty degrees relative to the upper level triangle 20, the point will be at the upper right of the respective triangle, such as point E in subdivision triangle 21(3); and (iii) for the point whose barycentric coordinates are (bary_2_a, bary_2_b, bary_2_c)

(a) for the subdivision triangles, such as triangles 21(0), 21(2) and 21(3) that has the same alignment as the upper level triangle 20, the point will be at the lower right of the respective triangle, such as points E in triangle 21(0), F in triangle 21(1) and C in triangle 21(2), but (b) for the subdivision triangles, such as triangle 21(3) that has an alignment rotated one hundred and eighty degrees relative to the upper level triangle 20, the point will be at the upper left of the respective triangle, such as point D in subdivision triangle 21(3).

It will further be appreciated that, since the coordinates for each point are barycentric coordinates, the sum of the values of the coordinates for each point equals "one." That is, for example, for the coordinates $$(\text{bary\_0\_a}, \text{bary\_0\_b\_}, \text{bary\_0\_c}) = \left(\frac{\alpha_n \pm 1}{2^n}, \frac{\beta_n}{2^n}, \frac{\chi_n}{2^n}\right)$$

of one point, $$\frac{\alpha_n \pm 1}{2^n} + \frac{\beta_n}{2^n} + \frac{\chi_n}{2^n} = 1,$$

and similarly for the coordinates of the other points. Accordingly, it will be unnecessary for the computer graphics system to actually perform the calculation to generate a value for one of the variables as described above in connection with Code Segment 1. For example, instead of providing a code fragment for case "case 0" (lines (5) through (7) of Code Segment 1) and generating values for bary__0_a, bary__1_a and bary__2_a, as described above in connection with. lines (21) and (24), a code segment can be provided with code fragments for two of the three cases, for example, cases "case 1" and "case 2," in which individual variables are updated. In addition, the code fragment for "case 3" can have lines for updating only variables "b," "C" and "sign." Continuing with that example, the code segment will have lines (not shown) that enable the computer graphics system to generate the value for bary__0_a, which corresponds to $$\text{``}\frac{\alpha_n \pm 1}{2^n}\text{,''}$$

as

"1-(bary__0_b+bary__0_c)," which corresponds to $$\text{``}1-\left(\frac{\beta_n}{2^n}+\frac{\chi_n}{2^n}\right)\text{.''}$$

Similarly, the computer graphics system can generate the values for bary__1_a and bary__2_a, both of which correspond to $$\text{``}\frac{\alpha_n}{2^n}\text{,''}$$

as either "1-(bary__1_b+bary__1_c), which corresponds to $$1-\left(\frac{\beta_n \pm 1}{2^n}+\frac{\chi_n}{2^n}\right),$$

or "1-(bary__2_b+bary__2_c)," which corresponds to $$\text{``}1-\left(\frac{\beta_n}{2^n}+\frac{\chi_n \pm 1}{2^n}\right)\text{.''}$$

Alternatively, since the value bary__0_a, $$\text{``}\frac{\alpha_n \pm 1}{2^n}\text{,''}$$

corresponds to $$\text{``}\frac{\alpha_n}{2^n}+\frac{\text{sign}}{\text{size}}\text{,''}$$

and since the values for bary__1_a and bary__2_a both correspond to $$\text{``}\frac{\alpha_n}{2^n}\text{,''}$$

after the computer graphics system has generated the value for bary__0_a, it can generate the values for bary__1_a and bary__2_a by subtracting the value $$\text{``}\frac{\text{sign}}{\text{size}}\text{''}$$

from the value generated for bary__0_a.

Figure 4:
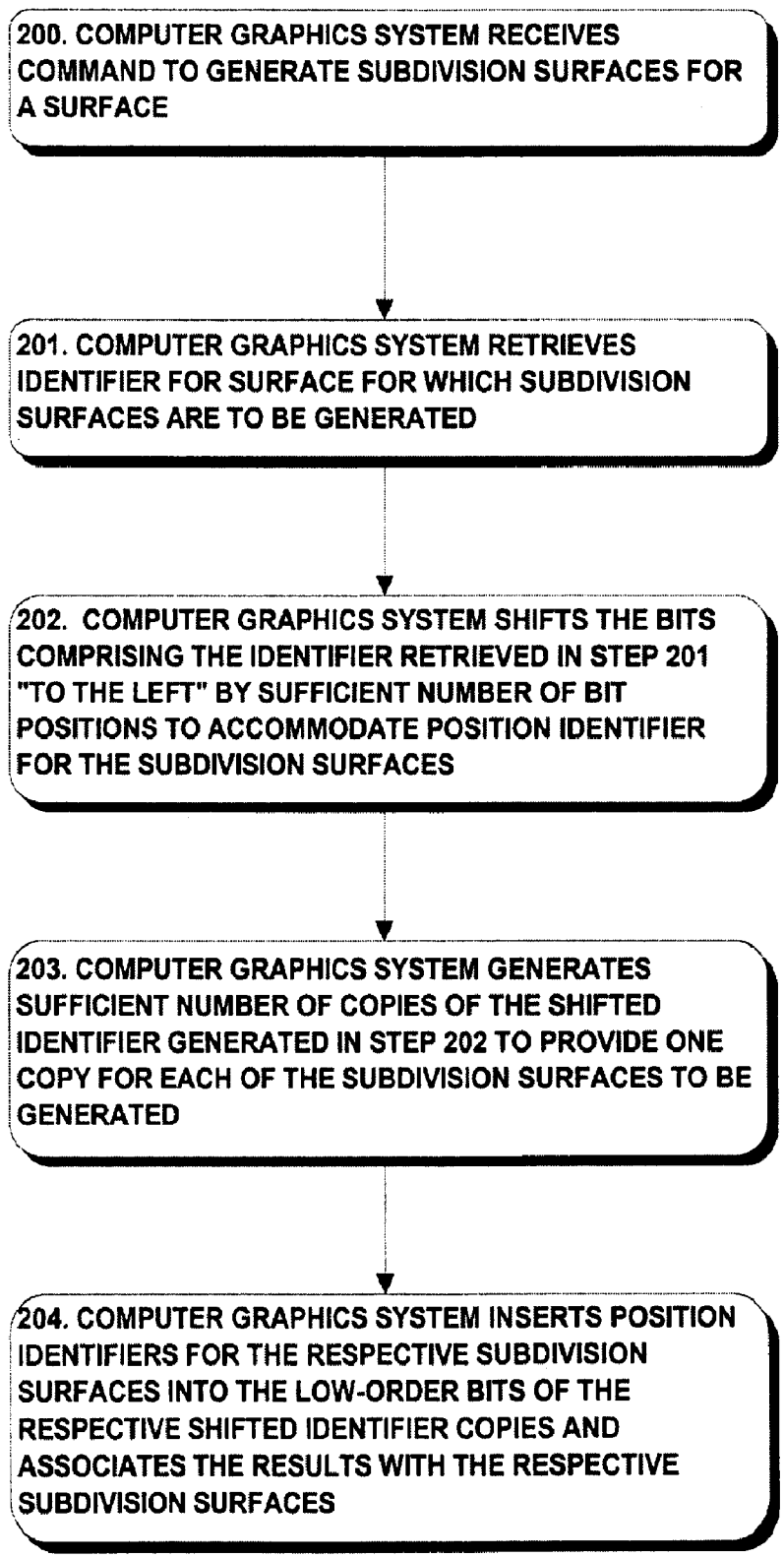
FIG. 4 is a flow chart depicting operations performed by the computer graphics system in connection with generating identifiers for subdivision surfaces for use in connection with determining barycentric coordinates as described in connection with FIG. 3.

FIG. 4 depicts a flow chart of operations performed by the computer graphics system 10 in connection with generating identifiers for subdivision triangles for a triangle, given the identifier for the triangle from which the subdivision triangles are to be formed. The operations will be apparent to those skilled in the art from the description above in connection with FIG. 2. It will be apparent that, when subdivision triangles are generated at any level for a triangle, the triangle will be divided into four subdivision triangles, and so the computer graphics system 10 will generate four identifiers, one identifier for each of the subdivision triangles. In the flow chart depicted in FIG. 1, it is assumed that the upper level triangle is associated with an identifier in which the low-order bit $b_0$ in the word containing the identifier is set to the value "one" as the bit $b_0$ of the identifier. In that case, the computer graphics system 10 can, for each subdivision level, generate the identifiers for the respective subdivision triangles by shifting the contents of the word containing the identifier for the triangle that is to be subdivided to the "left" by two bit positions, copying the shifted word into sufficient numbers of storage locations to accommodate the identifiers for the respective subdivision triangles, and providing the appropriate bit values in the least significant bit positions of the word for the index "$t_n$" that is associated with the respective subdivision triangle.

The invention provides a number of advantages. In particular, the invention provides an arrangement for efficiently encoding a subdivision triangle such that its barycentric coordinates can be readily recovered. It will be apparent that the coordinates for a subdivision triangle can be encoded in the identifiers $b_{2n} \ldots b_0$. Accordingly, only one word is needed to specify the coordinates for a subdivision triangle, instead of one word for each of the components of the actual coordinates. Moreover, it is apparent that the word containing the identifier can be stored as an integer, whereas the words that contain the components of the coordinates will need to comprise floating point numbers.

Another advantage is that the identifiers are spatially coherent. That is, identifiers $b_{2n} \ldots b_0$ that are associated with subdivision triangles in an upper-level triangle 20, and whose binary-encoded values are relatively close to one another will also be spatially close, within the upper-level triangle 20.

Furthermore, the methodology, described above in connection with equations (6) through (22) and FIG. 3, for determining the barycentric coordinates of a subdivision triangle using its identifier is efficient, since the coordinates can be recovered in generally constant time.

Moreover, it will be appreciated that, during generation of the subdivision triangles, it is sufficient for the computer graphics system 10 to generate the identifiers for the subdivision triangles as described in connection with FIG. 4; the computer graphics system 10 need not, for example generate the multi-dimensional coordinates for the points that define the respective subdivision triangles at that point. It will be apparent that, when the computer graphics system 10 is generating the identifiers as described above, it is essentially engaged in manipulation of integers, whereas generation of the coordinates of the points that define the respective subdivision triangles would require use of floating-point arithmetic. The computer graphics system 10 can delay generating the coordinates for the points until the operator determines that the actual coordinates of respective ones of the points defining particular ones of the subdivision triangles are required, which may not occur.

It will be appreciated that, once the barycentric coordinates of the three points defining the subdivision triangle at the respective subdivision level have been determined, if necessary the actual the coordinates in multi-dimensional space can be determined using the coordinates (a,b,c) of the points A, B, and C defining the upper level triangle 20 in a conventional manner.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. In a computer graphics system comprising a computer and a display element operable to receive a display-controlling electrical output from the computer and to generate in response to the display-controlling electrical output a human-perceptible image, the computer being operable to generate the display-controlling electrical output in response to calculations, executable by the computer, of respective pixel values for respective pixels in the image, each pixel corresponding to a point in the image, the calculations of pixel values being executable by the computer in response to coordinates determined for points defining a subdivision surface for the image,
   an improvement for generating coordinates for points defining a subdivision surface of an upper level surface element at a predetermined subdivision level from an identifier associated with the subdivision surface, the identifier including a plurality of position codes each identifying a position relative to a higher level, the improvement comprising:
   A. means for selecting from the identifier one of the position codes;
   B. means for determining the position of a subdivision surface associated with the position code relative to a higher level subdivision surface; and
   C. means for executing the selecting and determining through a plurality of iterations, to enable iterative selecting of identifiers associated with successive levels, thereby to enable determining the positions of subdivision surfaces at successive levels, to the predetermined subdivision level;
   in which the upper level surface element and the subdivision surfaces are triangular;
   in which in at least one level the number of subdivision surfaces in a surface at a higher level is four, the subdivision surfaces being defined by (i) three line segments interconnecting three points that define the surface at the higher level, and (ii) three line segments, each interconnecting (a) a point that defines the surface at the higher level, and (b) a point on the line segment interconnecting the other two points that define the surface at the higher level, the point dividing the line segment according to a selected ratio;
   in which the ratio is such that the point dividing the line segment bisects the line segment; and
   in which the means for determining of relative position includes means for determining the position of the subdivision surface relative to the upper level surface element in accordance with $$M_{i_1}^1 \ldots M_{i_n}^n \begin{pmatrix} e_1 \\ e_0 \end{pmatrix},$$

where
   (i) "n" refers to the subdivision surface's subdivision level relative to the upper level surface element,
   (ii) the superscripts "1 . . . n" refer to successive subdivision levels relative to the upper level surface element,
   (iii) each
   "$M_{i_x}^x$"
is associated with the value of the position code "$i_x$" ("x" ranging from "1" to "n") associated with the "x-th" subdivision level, where
   (a) $i_x$=0, 1 and 2 refer to a position at level "x" refer to a top, lower left and lower right position, respectively, relative to a level "x−1" and an alignment corresponding to an alignment at level "x−1," and (b) $i_x=3$ refers to a lower center position relative to a level "x−1" and an alignment rotated relative to an alignment at level "x−1,"

(iv) each "$M_{i_x}^x$" represents a matrix $$M = 0: M_0 = \begin{pmatrix} 1 & 0 \\ \frac{a}{2} & \frac{1}{2} \end{pmatrix}$$

$$M = 1: M_1 = \begin{pmatrix} 1 & 0 \\ \frac{b}{2} & \frac{1}{2} \end{pmatrix}$$

$$M = 2: M_2 = \begin{pmatrix} 1 & 0 \\ \frac{c}{2} & \frac{1}{2} \end{pmatrix}$$

$$M = 3: M_3 = \begin{pmatrix} 1 & 0 \\ \frac{a+b+c}{2} & \frac{-1}{2} \end{pmatrix}$$

(v) where $e_i=(1,1,1)^T$ and $e_2=(a,b,c)^T$, the result of $$M_{i_1}^1 \ldots M_{i_n}^n \begin{pmatrix} e_1 \\ e_0 \end{pmatrix}$$

being a vector containing a triple $(\alpha_1 a+\beta_1 b+\chi_1 c, \alpha_2 a+\beta_2 b+\chi_2 c, \alpha_3 a+\beta_3 b+\chi_3 c)$, where $(\alpha_1,\beta_1,\chi_1),(\alpha_2,\beta_2,\chi_2)$ and $(\alpha_3,\beta_3,\chi_3)$ comprise barycentric coordinates of the three points defining the subdivision surface relative to the upper level surface element, the coordinates of points defining the subdivision surface being usable by the computer to calculate pixel values for the image to generate the display-controlling electrical output, and to enable the display element to display a human-perceptible image in response to the display-controlling electrical output.

2. The improvement of claim 1 in which the means for determining relative position comprises:

A. means for determining the value of the position code $i_x$, selected during an x-th iteration;

B. means for generating a preliminary coordinate value by, during each iteration, (i) if the value of the position code is 0, 1 or 2, updating an associated one of at least two of respective preliminary coordinate values $\alpha,\beta$ or $\chi$, respectively, by a value $$\frac{\text{sign}}{2^x},$$

or (ii) if the value of the position code is 3, updating all of the at least two preliminary coordinate values $\alpha,\beta$ and $\chi$ by the value $$\frac{\text{sign}}{2^x}$$

and complementing the value of sign; and

C. means for, after an n-th iteration, generating subsequent values for coordinates $(\alpha_1,\beta_1,\chi_1),(\alpha_2,\beta_2,\chi_2)$ and $(\alpha_3,\beta_3,\chi_3)$ in relation to the preliminary values generated for the at least two preliminary coordinate values $\alpha, \beta$ and $\chi$ and $$\frac{\text{sign}}{2^n}.$$

3. The improvement of claim 2 in which the means for generating a preliminary coordinate value comprises means for generating values for three preliminary coordinate values $\alpha, \beta$ and $\chi$, and generating subsequent coordinate value values comprises:

A. means for generating a plurality of copies of preliminary coordinates $(\alpha, \beta, \chi)$ each associated with a respective point defining the subdivision surface; and B. means for generating coordinates by adding $(\alpha_1,\beta_1,\chi_1)$ by adding $$\frac{\text{sign}}{2^n}$$

to $\alpha$ in one copy of $(\alpha, \beta, \chi)$, coordinates $(\alpha_2, \beta_2, \chi_2)$, by adding $$\frac{\text{sign}}{2^n}$$

to $\beta$ in a second copy of $(\alpha, \beta, \chi)$, and coordinates $(\alpha_3, \beta_3, \chi_3)$, by adding $$\frac{\text{sign}}{2^n}$$

to $\chi$ in a third copy of $(\alpha, \beta, \chi)$.

4. The improvement of claim 2 in which the means for determining relative position comprises means for, prior to a first iteration, initializing values of $\alpha, \beta$ and $\chi$ to zero and sign to one.

5. The improvement of claim 2 in which the means for generating a preliminary coordinate value comprises means for generating values for at most two of the preliminary coordinate values $\alpha, \beta$ and $\chi$, and the means for generating subsequent coordinate values comprises:

A. means for generating a plurality of copies of preliminary coordinates $(\alpha, \beta, \chi)$ each associated with a respective point defining the subdivision surface;

B. means for generating intermediate coordinates by adding $$\frac{sign}{2^n}$$

to a respective one of the at most two of the preliminary coordinate values in a respective one of the copies; and C. means for generating a third coordinate value in each of said copies.

6. The improvement of claim 5 in which the means for determining relative position comprises means for, prior to a first iteration, initializing values of the at most two of the preliminary coordinate values to zero and sign to one.

7. The improvement of claim 6 in which the means for generating the third coordinate value in each of said copies comprises means for subtracting the sum of the values of the at most two of the intermediate coordinate values from one in each of said copies.

8. The improvement of claim 1 in which the means for determining relative position comprises:
   A. means for determining the value of the position code $i_x$, selected by the position code selection step during an x-th iteration;
   B. means for generating a preliminary coordinate value by, during each iteration,
      (i) if the value of the position code is 0, 1 or 2, updating an associated one of at least two of respective preliminary coordinate values $\alpha$, $\beta$ or $\chi$, respectively, by a value
      $sign*2^{n-x}$, or
      (ii) if the value of the position code is 3, updating all of the at least two preliminary coordinate values $\alpha$, $\beta$ and $\chi$ by the value
      $sign*2^{n-1}$
   and complementing the value of sign; and
   C. means for, after an n-th iteration, generating subsequent values for coordinates $(\alpha_1,\beta_1,\chi_1),(\alpha_2,\beta_2,\chi_2)$ and $(\alpha_3,\beta_3,\chi_3)$
in relation to the values generated for the at least two preliminary coordinate values $\alpha$, $\beta$ and $\chi$ and $2^n$.

9. The improvement of claim 8 in which the means for generating a preliminary coordinate value comprises means for generating values for three preliminary values $\alpha$, $\beta$ and $\chi$, and the means for generating subsequent coordinate values comprises:
   A. means for generating three intermediate values $\alpha'$, $\beta'$ and $\chi'$ by dividing each of the three preliminary values $\alpha$, $\beta$ and $\chi$ by $2^n$;
   B. means for generating a plurality of copies of preliminary coordinates $(\alpha', \beta', \chi')$ each associated with a respective point defining the subdivision surface; and C. means for generating coordinates $(\alpha_1,\beta_1,X_1)$ by adding $$\frac{sign}{2^n}$$

to $\alpha'$ in one copy of $(\alpha',\beta',\chi')$, coordinates $(\alpha_2,\beta_2,\chi_2)$ by adding $$\frac{sign}{2^n}$$

to $\beta'$ in a second copy of $(\alpha',\beta',\chi')$, and coordinates $(\alpha_3,\beta_3,\chi_3)$ by adding $$\frac{sign}{2^n}$$

to $\chi'$ in a third copy of $(\alpha',\beta',\chi')$.

10. The improvement of claim 8 in which the means for determining relative position comprises means for, prior to a first iteration, initializing values of $\alpha$, $\beta$ and $\chi$ to zero and sign to one.

11. The improvement of claim 8 in which the means for generating a preliminary coordinate value comprises means for generating values for at most two of the preliminary coordinate values $\alpha$, $\beta$ and $\chi$, and the means for generating subsequent coordinate values comprises:
   A. means for generating three intermediate values $\alpha'$, $\beta'$ and $\chi'$ by dividing each of the at most two preliminary values by $2^n$;
   B. means for generating a plurality of copies of preliminary coordinates $(\alpha', \beta', \chi')$ each associated with a respective point defining the subdivision surface;
   C. means for generating intermediate coordinates by adding $$\frac{sign}{2^n}$$

to a respective one of the at most two of the preliminary coordinate values in a respective one of the copies; and
   D. means for generating a third coordinate value in each of said copies.

12. The improvement of claim 11 in which the means for determining relative position comprises means for, prior to a first iteration, initializing values of the at most two of the preliminary coordinate values to zero and sign to one.

13. The improvement of claim 12 in which the means for generating coordinates comprises means for generating the third coordinate value in each of said copies by subtracting the sum of the values of the at most two of the intermediate coordinate values from one in each of said copies.

* * * * *